US009684964B2

(12) United States Patent
Nakatani et al.

(10) Patent No.: US 9,684,964 B2
(45) Date of Patent: Jun. 20, 2017

(54) IMAGE PROCESSING APPARATUS AND IMAGE PROCESSING METHOD FOR DETERMINING DISPARITY

(71) Applicants: Sony Corporation, Tokyo (JP); Sony Computer Entertainment Inc., Tokyo (JP)

(72) Inventors: Ayaka Nakatani, Kanagawa (JP); Yoshihiro Myokan, Kanagawa (JP); Akio Ohba, Kanagawa (JP); Tetsugo Inada, Kanagawa (JP); Hiroyuki Segawa, Kanagawa (JP)

(73) Assignees: Sony Corporation (JP); Sony Interactive Entertainment Inc. (JP)

( * ) Notice: Subject to any disclaimer, the term of this patent is extended or adjusted under 35 U.S.C. 154(b) by 525 days.

(21) Appl. No.: 14/189,026

(22) Filed: Feb. 25, 2014

(65) Prior Publication Data
US 2014/0294289 A1  Oct. 2, 2014

(30) Foreign Application Priority Data

Mar. 29, 2013 (JP) .................................. 2013-072669

(51) Int. Cl.
*G06K 9/00* (2006.01)
*G06T 7/00* (2017.01)
(Continued)

(52) U.S. Cl.
CPC .............. *G06T 7/0075* (2013.01); *G06T 7/50* (2017.01); *G06T 7/593* (2017.01);
(Continued)

(58) Field of Classification Search
CPC ... G06T 7/0051; G06T 7/0065; G06T 7/0075; G06T 2207/20228; H04N 13/0007;
(Continued)

(56) References Cited

U.S. PATENT DOCUMENTS 8,385,630 B2 * 2/2013 Sizintsev .............. G06T 7/0022
382/154
9,020,242 B2 * 4/2015 Bingrong .............. G06T 7/0065
382/154

(Continued)

FOREIGN PATENT DOCUMENTS

CN  102547338 A  7/2012
CN  102819843 A  12/2012
(Continued)

OTHER PUBLICATIONS

Nicole Atzpadin, Peter Kauff, and Oliver Schreer, "Stereo Analysis by Hybrid Recursive Matching for Real-Time Immersive Video Conferencing", IEEE, Transaction on Circuits and System for Video Technology, vol. 14, No. 3, Mar. 2004, pp. 321-334.*

(Continued)

*Primary Examiner* — Eric Rush
(74) *Attorney, Agent, or Firm* — Lerner, David, Littenberg, Krumholz & Mentlik, LLP

(57) ABSTRACT

There is provided an image processing apparatus including a stereo matching unit configured to obtain right and left disparity images by using stereo matching, based on a pair of images captured by right and left cameras, respectively, a filter processing unit configured to perform filter processing on the disparity images, and a first merging unit configured to make a comparison, in the disparity images that have undergone the filter processing, between disparity values at mutually corresponding positions in the right and left disparity images and to merge the disparity values of the right and left disparity images based on a comparison result.

1 Claim, 39 Drawing Sheets

(51) Int. Cl.
*G06T 7/50* (2017.01)
*G06T 7/593* (2017.01)
*H04N 13/00* (2006.01)

(52) U.S. Cl.
CPC ..... *H04N 13/0007* (2013.01); *H04N 13/0018* (2013.01); *H04N 13/0022* (2013.01); *G06T 2207/10012* (2013.01); *G06T 2207/20228* (2013.01); *H04N 2013/0074* (2013.01)

(58) Field of Classification Search
CPC ........... H04N 13/0018; H04N 13/0022; H04N 2013/0074; H04N 2013/0081
USPC ................................ 382/106, 154, 254, 260
See application file for complete search history.

(56) References Cited

U.S. PATENT DOCUMENTS

| | | | |
|---|---|---|---|
| 2012/0014590 A1* | 1/2012 | Martinez-Bauza | G06T 7/0022 382/154 |
| 2012/0321172 A1* | 12/2012 | Jachalsky | G06T 7/0075 382/154 |
| 2013/0064443 A1 | 3/2013 | Schlosser et al. | |
| 2013/0077852 A1 | 3/2013 | Chang et al. | |
| 2013/0176300 A1* | 7/2013 | Robert | H04N 13/0022 345/419 |
| 2014/0198977 A1* | 7/2014 | Narasimha | G06K 9/6212 382/154 |

FOREIGN PATENT DOCUMENTS

| | | |
|---|---|---|
| CN | 102999913 A | 3/2013 |
| JP | H07282259 A | 10/1995 |
| JP | 2000311244 A | 11/2000 |
| JP | 2004184240 A | 3/2004 |
| JP | 2011186958 A | 9/2011 |
| JP | 2012113622 A | 6/2012 |
| WO | 2012090309 A1 | 7/2012 |
| WO | 2012132167 A1 | 10/2012 |

OTHER PUBLICATIONS

Serap Askar, Peter Kauff, Nicole Brandenburg and Oliver Schreer, "Fast Adaptive Upscaling of Low Structured Images Using a Hierarchical Filling Strategy", IEEE, Region 8 International Symposium on Video / Image Processing and Multimedia Communications, Jun. 2002, pp. 289-293.*

Kurt Konolige, "Small Vision Systems: Hardware and Implementation", Springer-Verlag, Robotics Research, 1998, pp. 203-212.*

Ohta et al., Stereo by Intra- and Inter-Scanline Search Using Dynamic Programming, IEEE Transactions on Pattern Analysis and Machine Intelligence, vol. PAM1-7, No. 2, p. 139-154, Mar. 1985.

Zitnick et al.; A Cooperative Algorithm for Stereo Matching and Occlusion Detection; Tech Report CMU-RI-TR-99-35 (1999).

Hirschmuller et al.; Real-Time Correlation-Based Stereo Vision with Reduced Border Enors; In International Journal of Computer Vision, vol. 47 (1/2/3), pp. 229-246. (2002).

Kopf et al.; Joint Bilateral Upsampling; ACM Transaction of Graphics (2007).

Chinese Office Action and Search Report for Application No. 201410069216.3 dated Nov. 21, 2016.

Japanese Office Action for Application No. 2013-072669 dated Jan. 24, 2017.

Yoshiki Ninomiya, Current Situation and Future Vision of Picture Recognition Technology for Making Car Intelligent, Information Processing Society of Japan, Nov. 15, 2010, pp. 1569-1574, vol. 51, No. 12, Dec. 2010, Japan.

* cited by examiner

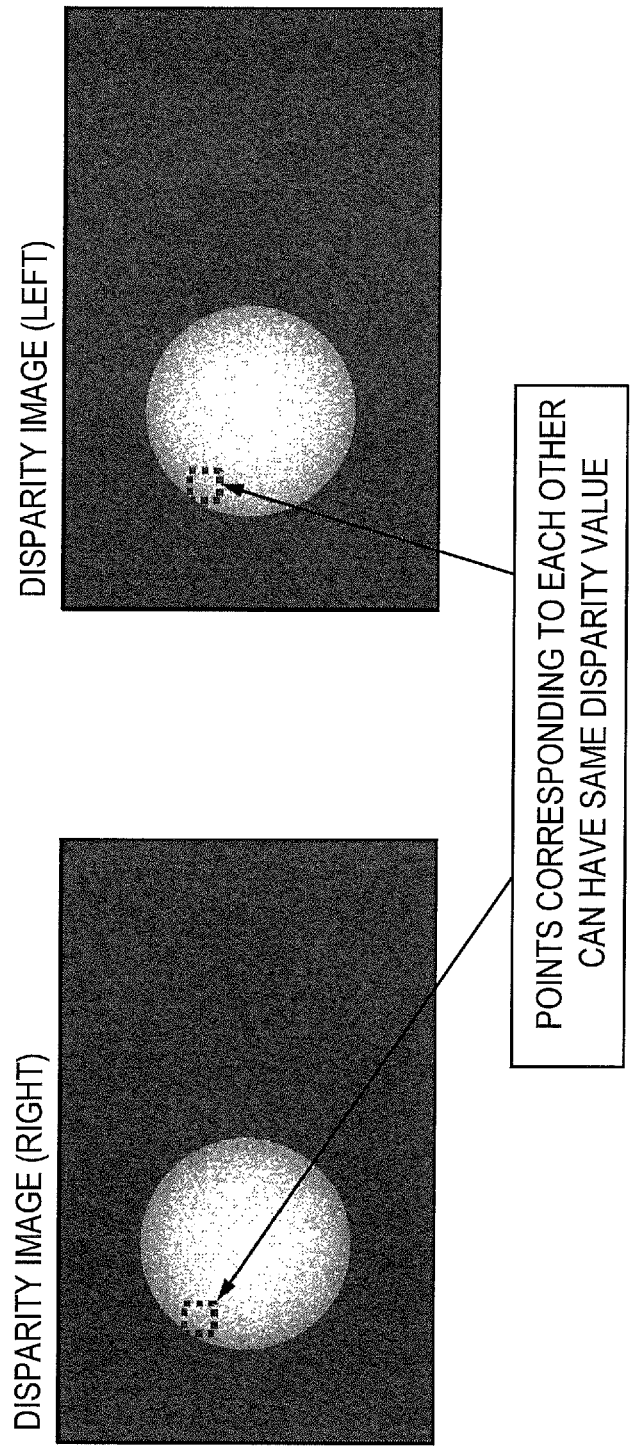

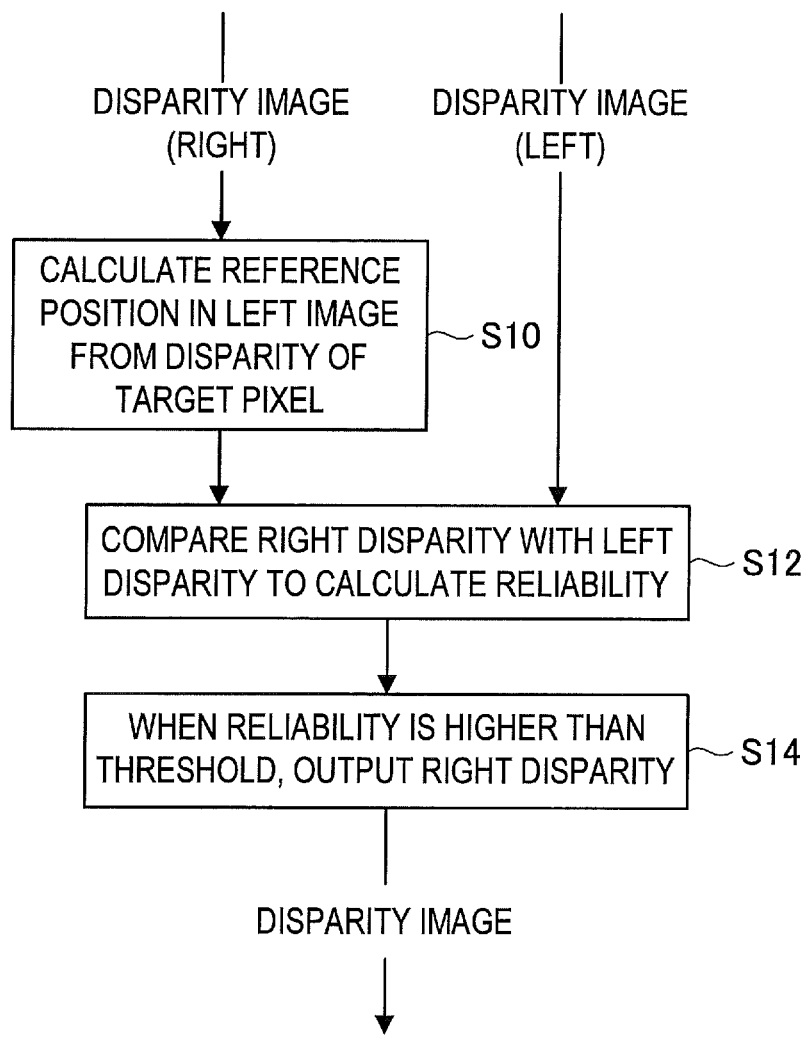

FIG. 7

BASED ON RIGHT DISPARITY IMAGE

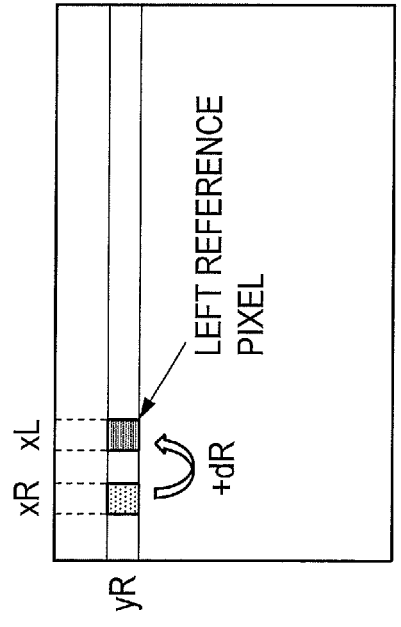

DISPARITY IMAGE (RIGHT)

RIGHT TARGET PIXEL

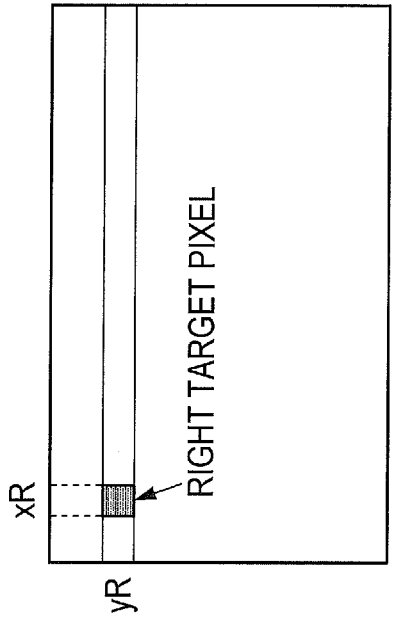

DISPARITY IMAGE (LEFT)

LEFT REFERENCE PIXEL

◆ WHEN PROJECTION CONVERSION, FOR EXAMPLE, RESULTS IN SAME HEIGHT OF OBJECT SHOT IN RIGHT AND LEFT IMAGES, REFERENCE POINT CAN BE FOUND ON HORIZONTAL LINE

◆ WHEN DISPARITY IN POSITION (xR, yR) IS dR, REFERENCE POSITION (xL, yL) OF DISPARITY IMAGE OF LEFT CAMERA IS (xR + dR, yR).

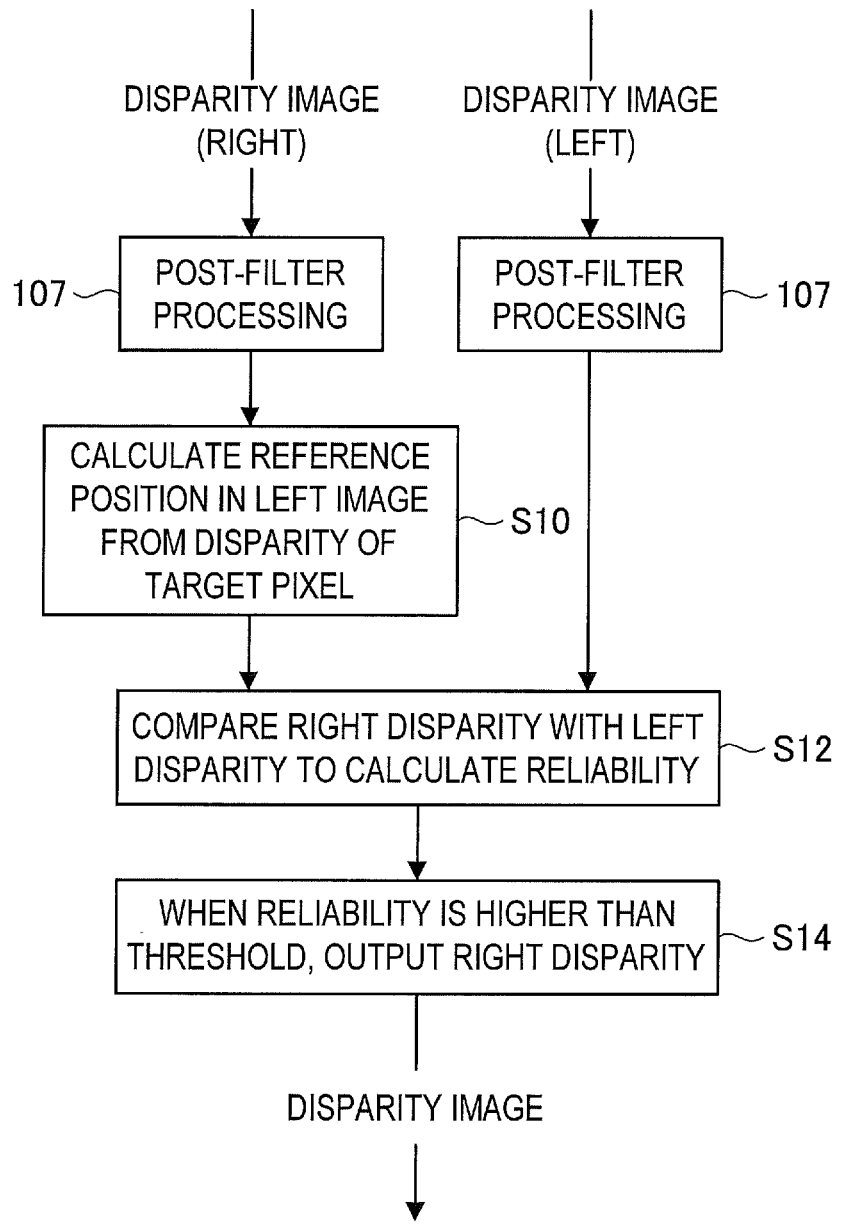

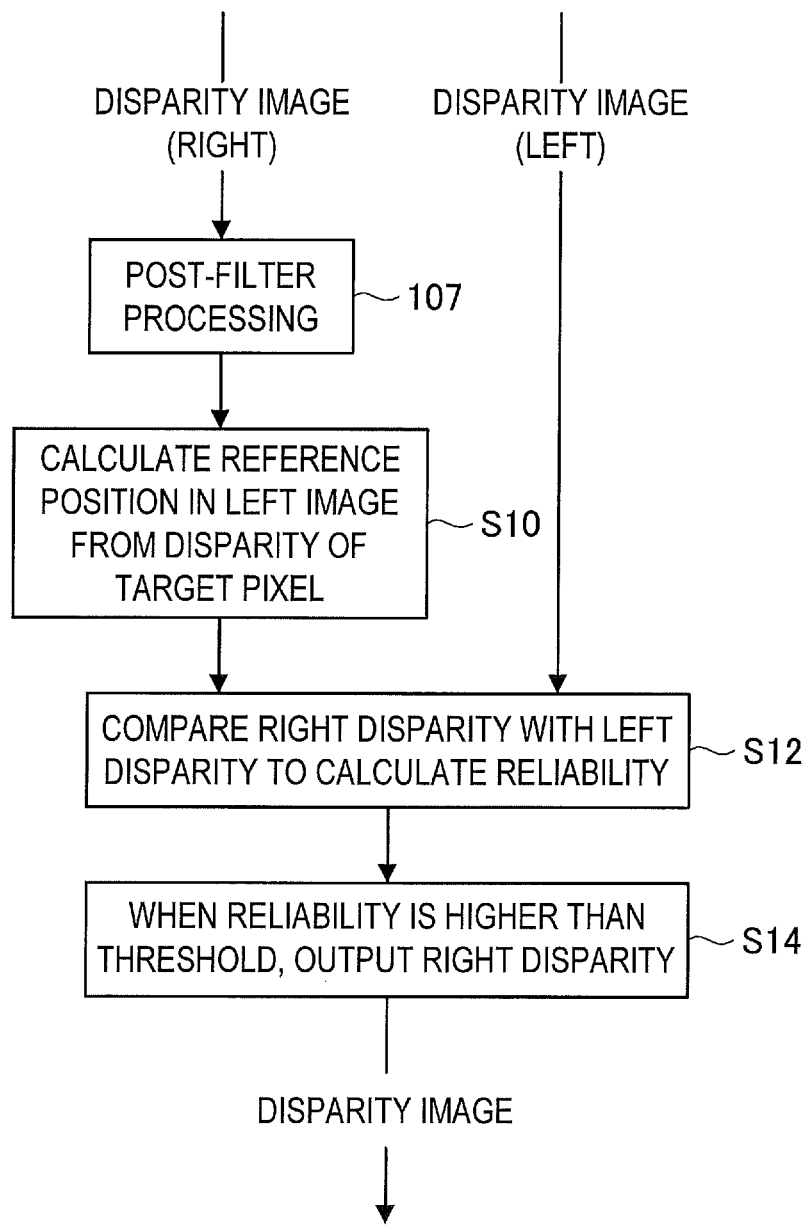

FIG. 10
BASED ON RIGHT DISPARITY IMAGE
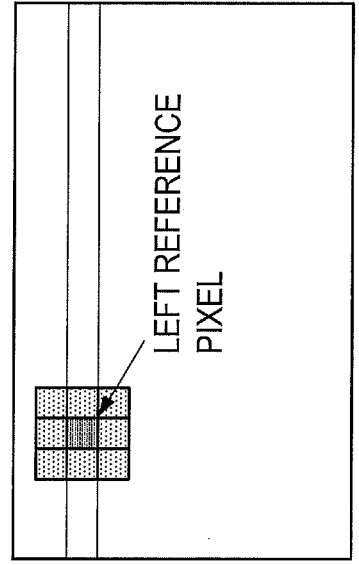
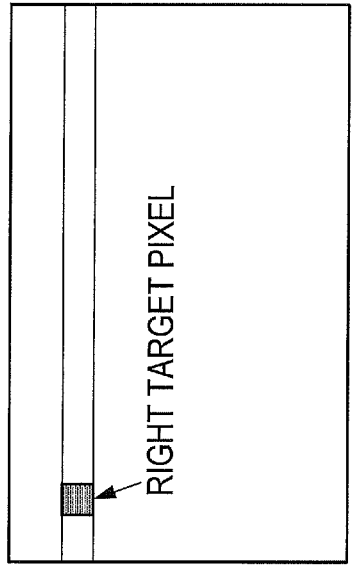
- COMPARE DISPARITY dR OF RIGHT TARGET PIXEL WITH RESPECTIVE DISPARITIES dL[i][j](i=0, ..., 8) OF PIXELS INCLUDING AND NEIGHBORING LEFT REFERENCE PIXEL TO DETERMINE RELIABILITY OF dR

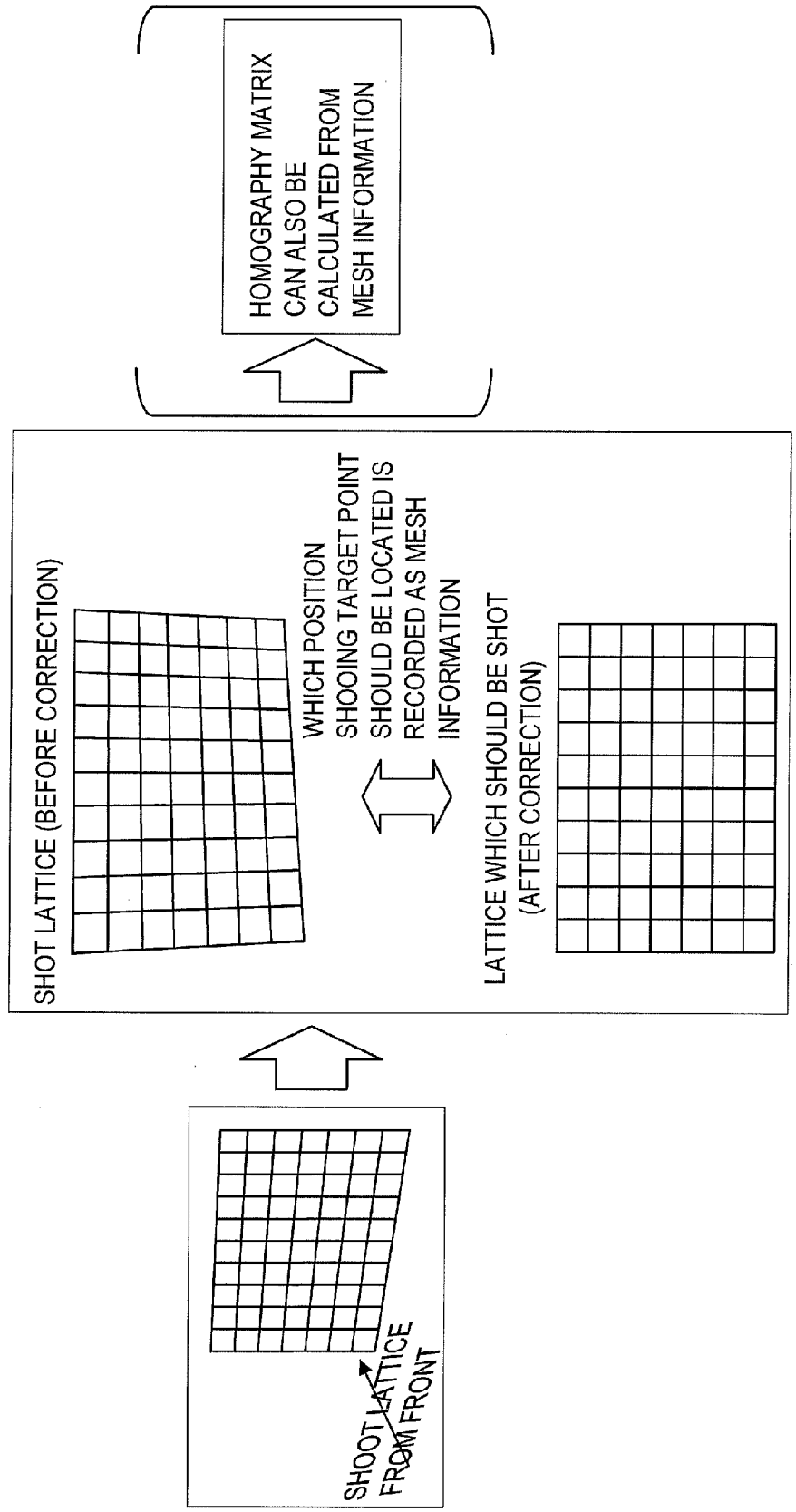

IMAGE PROCESSING APPARATUS AND IMAGE PROCESSING METHOD FOR DETERMINING DISPARITY

CROSS REFERENCE TO RELATED APPLICATIONS

This application claims the benefit of Japanese Priority Patent Application JP 2013-072669 filed Mar. 29, 2013, the entire contents of which are incorporated herein by reference.

BACKGROUND

The present disclosure relates to an image processing apparatus and an image processing method.

Use of simple algorithm in calculating a disparity for high speed stereo matching might cause calculation of many wrong disparity values. To address this, a technique is described in YUICHI OHTA, TAKEO KANADA "Stereo by Intra- and Inter-Scanline Search Using Dynamic Programming" IEEE TRANSACTIONS ON PATTERN ANALYSIS AND MACHINE INTELLIGENCE, VOL. PAMI-7, No. 2, MARCH 1985 (Non-patent Literature 1).

SUMMARY

Non-patent Literature 1 describes a method for calculating a disparity using constraint for smooth change of the disparity on an epipolar line. However, such related art that is described in Non-patent Literature 1 described above has harmful effects such as occurrence of horizontal streak noise, an influence of a measurement result of a disparity on the same horizontal line, and the like, and has trouble such as a large amount of processing. Meanwhile, there is a simple method in which right and left disparity information is mutually referred to while enhancing reliability, so that a wrong disparity is eliminated. In this method, right and left disparity values obtained by stereo matching are compared with each other on an one-to-one basis and merged together. Thus, when one of the right and left disparities has an anomaly value, the reliability of the merged disparity value is lowered, and it is not possible to obtain an effective disparity value. For this reason, it is difficult to detect a distance to an object based on a disparity value.

Hence, it is desirable to obtain a merged disparity value with high accuracy, even though one of the right and left disparity values to be merged based on the stereo matching does not have a correct value.

According to an embodiment of the present disclosure, there is provided an image processing apparatus including a stereo matching unit configured to obtain right and left disparity images by using stereo matching, based on a pair of images captured by right and left cameras, respectively, a filter processing unit configured to perform filter processing on the disparity images, and a first merging unit configured to make a comparison, in the disparity images that have undergone the filter processing, between disparity values at mutually corresponding positions in the right and left disparity images and to merge the disparity values of the right and left disparity images based on a comparison result.

Further, the filter processing unit may perform the filter processing on at least one of the right and left disparity images.

Further, the filter processing unit may perform the filter processing on each of the right and left disparity images.

Further, the filter processing unit includes a median filter.

Further, the filter processing unit may perform the filter processing on one of the right and left disparity images. The first merging unit may compare a disparity value of a particular pixel in the one of the disparity images that have undergone the filter processing with disparity values of a pixel corresponding to the particular pixel and a plurality of neighboring pixels in the other disparity image that have not undergone the filter processing.

Further, the first merging unit may merge the disparity values, based on results of comparison between a predetermined threshold and a difference between the disparity value of the particular pixel and each of the disparity values of the pixel corresponding to the particular pixel and a plurality of neighboring pixels in the other disparity image.

Further, the first merging unit may merge the disparity values based on a transfer function defining a relationship between the predetermined threshold and reliability of the disparity values.

Further, the image processing apparatus may further include a second merging unit configured to obtain the captured images having a plurality of resolutions, a plurality of the stereo matching units, a plurality of the filter processing units, and a plurality of the first merging units being provided for each of the plurality of resolutions, and configured to merge the disparity values of the respective plurality of resolutions each merged by the first merging unit.

Further, when a disparity value of a particular pixel in one of the disparity images which has a first resolution is not obtained, the second merging unit may merge the disparity values of the respective plurality of resolutions, based on a disparity value of a pixel corresponding to the particular pixel in one of the disparity images which has a second resolution lower than the first resolution.

Further, the stereo matching unit may include a reliability calculation unit configured to calculate reliability of the disparity values of the right and left disparity images. When the reliability may be higher than a predetermined threshold and the disparity value of the particular pixel in the disparity image having the first resolution is not obtained, the second merging unit considers the disparity value as an unknown value.

Further, the second merging unit may overwrite a disparity value of one of the disparity images which has a second resolution higher than a first resolution, based on a disparity value of one of the disparity images which has the first resolution.

Further, when the disparity value of the particular pixel of the disparity image having the first resolution and disparity values of plurality of pixels neighboring the particular pixel are within a predetermined range, the second merging unit may overwrite the disparity value of a pixel corresponding to the particular pixel in the disparity image having the second resolution, based on the disparity value of the particular pixel.

Further, the second merging unit may select one of the plurality of resolutions based on a disparity value of a target region in a disparity image having a lowest resolution among the plurality of resolutions, and performs merging on the disparity value of the target region based on a disparity image having the selected resolution.

Further, according to an embodiment of the present disclosure, there is provided an image processing method including obtaining right and left disparity images by using stereo matching, based on a pair of images captured by right and left cameras, respectively, performing filter processing on the disparity images, and making a comparison, in the disparity images that have undergone the filter processing, between disparity values at mutually corresponding positions in the right and left disparity images and merging the disparity values of the right and left disparity images based on a comparison result.

According to the embodiments of the present disclosure, it is possible to obtain a merged disparity value with high accuracy, even though one of the disparity values to be merged based on the stereo matching does not have a correct value.

BRIEF DESCRIPTION OF THE DRAWINGS

FIG. 5 is a schematic diagram for explaining a basic concept of the algorithm of a merging unit;

FIG. 6 is a schematic diagram illustrating basic processing by the merging unit;

FIG. 7 is a schematic diagram for explaining processing in FIG. 6;

FIG. 8 is a schematic diagram illustrating processing according to an embodiment, the processing including post-filter processing added thereto;

FIG. 9 is a schematic diagram illustrating an example where the post-filter processing is performed on only a right disparity image which is a reference source;

FIG. 10 is a schematic diagram illustrating a method for determining reliability of a disparity dR of a right target pixel by comparing the disparity dR with each of disparities dL[i] which are nine pixels neighboring and including a left reference target pixel;

FIG. 39 is a schematic diagram illustrating mesh information.

DETAILED DESCRIPTION OF THE EMBODIMENTS

Figure 1:
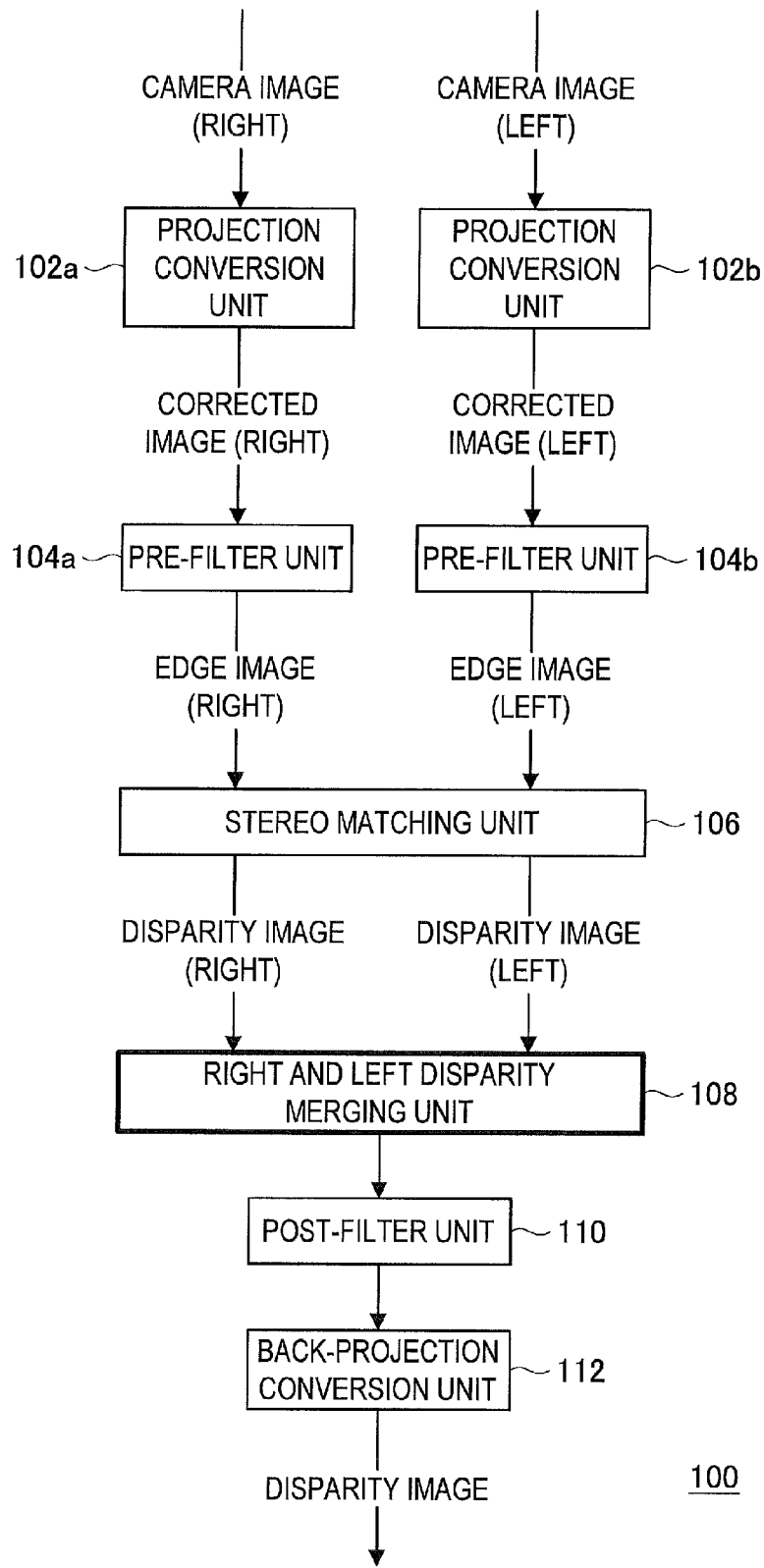
FIG. 1 is a schematic diagram illustrating an outline configuration of an image processing apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the descriptions will be given in the following order.

1. First Embodiment 1.1. Configuration Example of Image Processing Apparatus 1.2. Algorithm Used for Merging Unit
2. Second Embodiment
  2.1. Relationship between Distance from Object and Resolution
  2.2. Specific Example of Merging Plurality of Resolutions
  2.3. Specific Example of Merging Plurality of Resolutions Based on Low Resolution
  2.4. Method for Enhancing Disparity Obtaining Performance of Target Region
<1. First Embodiment>
[1.1. Configuration Example of Image Processing Apparatus]

Firstly, an overall flow of generating a disparity image according to a first embodiment of the present disclosure will be described with reference to FIG. 1. FIG. 1 is a schematic diagram illustrating an outline configuration of an image processing apparatus 100 according to the present embodiment. As illustrated in FIG. 1, the image processing apparatus 100 includes projection conversion units 102a, 102b, pre-filter units 104a, 104b, a stereo matching unit 106, a merging unit 108, a post-filter unit 110, and a back-projection conversion unit 112.

As illustrated in FIG. 1, two images of respective cameras separated in right-left directions are acquired as camera images (a camera image (left) and a camera image (right)). The projection conversion units 102a, 102b perform projection conversion on the respective images and output resultant images as a corrected image (left) and a corrected image (right). The pre-filter units 104a, 104b performs pre-filter processing on the right and left correction images and outputs resultant images as an edge image (left) and an edge image (right). Each edge image is inputted into the stereo matching unit 106 to undergo stereo matching. The stereo matching unit 106 performs the stereo matching and consequently outputs the right and left disparity images (a disparity image (left) and a disparity image (right)). The right and left disparity images are inputted into the merging unit 108. The merging unit 108 merges the disparity images (left and right) and outputs an image obtained by the merging to the post-filter unit 110. The post-filter unit 110 performs post-filter processing on the inputted image and inputs the image having undergone the post-filter processing into the back-projection conversion unit 112. The back-projection conversion unit 112 performs back-projection conversion on the inputted image and outputs a resultant image as a disparity image.

Figure 2:
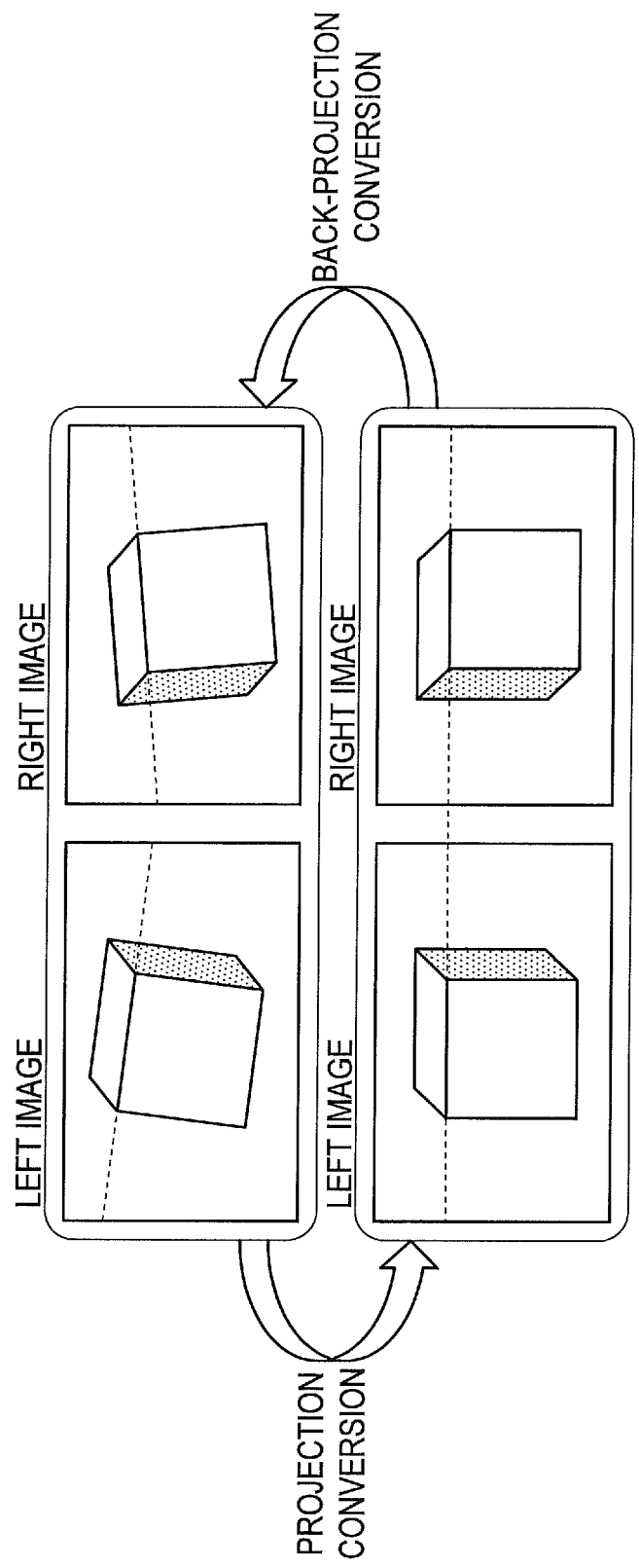
FIG. 2 is a schematic diagram illustrating processing by a projection conversion unit and a back-projection conversion unit.

Hereinafter, processing performed by each component illustrated in FIG. 1 will be described. FIG. 2 is a schematic diagram illustrating processing performed by the projection conversion units 102a, 102b and the back-projection conversion unit 112. To facilitate the stereo matching in subsequent processing, the projection conversion units 102a, 102b each deform right and left images so that points corresponding to each other in the right and left images align on a horizontal line (=a matching search direction). Specifically, the projection conversion units 102a, 102b parallelize epipolar lines. At this time, the projection conversion units 102a, 102b each uses mesh information or a homography matrix. FIG. 39 is a schematic diagram illustrating the mesh information. Here, the mesh information is information indicating a relationship between a tetragonal lattice shot in an inputted camera image and a proper position (position after correction) of the lattice. The mesh information is prepared by shooting a lattice in advance, as illustrated in FIG. 39. For the relationship between the lattice shot by a camera and a proper position (position after correction), information indicating a position where a shooting target should be located is recorded as the mesh information, as illustrated in FIG. 39. It is also possible to calculate a homography matrix from the mesh information. The back-projection conversion unit 112 performs processing reverse to the processing by the projection conversion units 102a, 102b. The back-projection conversion unit 112 performs processing of restoring the state of the image deformed by the projection conversion units 102a, 102b to an original state in a positional relationship of the original input image.

The pre-filter units 104a, 104b perform the pre-filter processing to reduce a luminance discrepancy between the right and left cameras and influence of shading in the stereo matching processing. For example, the Sobel filter or the Prewitt filter is used to generate a vertical edge image. This facilitates search of a disparity of mutually corresponding points in a horizontal direction in the stereo matching. Specifically, where a luminance value of an inputted image is g(x, y), and where a luminance value of an outputted image is f(x, y), the luminance value f(x, y) is obtained by calculating the following Formula (1).

$$f(x, y) = \sum_{j=0,1,2} \sum_{i=0,1,2} \{g(x+i-1, y+j-1) \cdot h(i, j)\}$$

When the Sobel filter is used, a value of h in Formula (1) can be expressed as the following Formula (2).

$$h = \begin{pmatrix} -1 & 0 & 1 \\ -2 & 0 & 2 \\ -1 & 0 & 1 \end{pmatrix}$$

Figure 3:
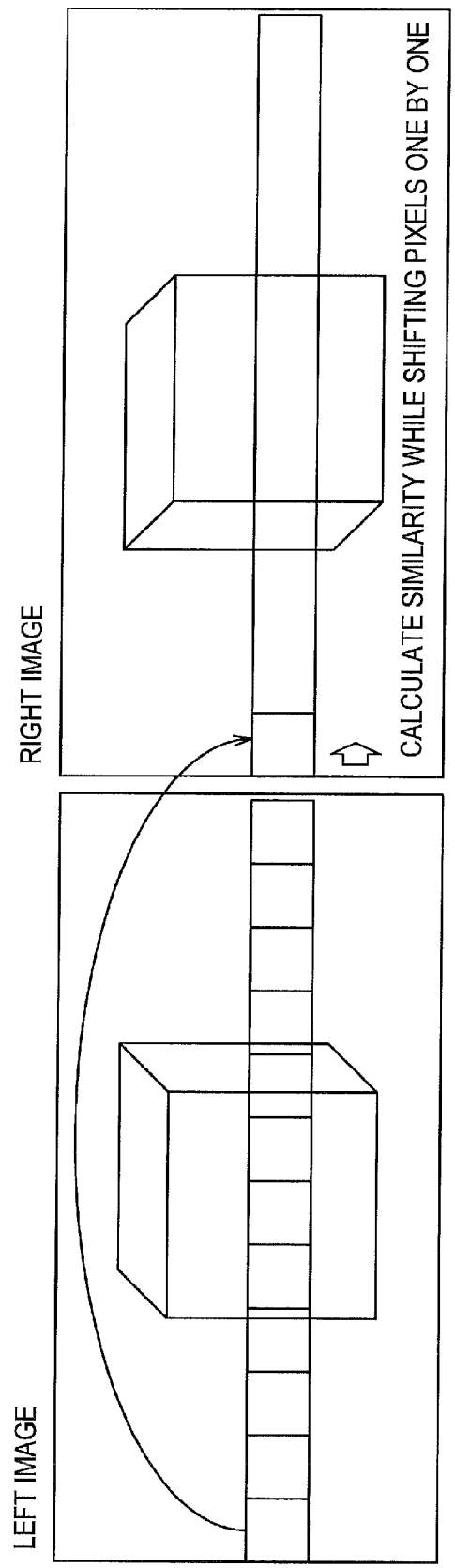
FIG. 3 is a schematic diagram illustrating how a stereo matching unit calculates disparity values.

The stereo matching unit 106 generates disparity images based on respective right and left images. The disparity images each have information (a disparity value) on a disparity for each pixel of the right and left images. For this reason, the stereo matching unit 106 performs block matching of the right and left images to generate the disparity images and extracts a block having highest similarity. When the left image is used as a reference, as illustrated in FIG. 3, the stereo matching unit 106 calculates a disparity value which indicates how many pixels a block in the right image similar to a target block in the left image moves by in the horizontal direction from a position of the target block in the left image.

Specifically, the stereo matching unit 106 calculates the disparity in a processing flow as described below. For example, when processing is performed in units of a 4×4 block, a range of the output coordinates (x, y) is ¼ of that of an input image in vertical and horizontal directions in both x and y. Right and left edge images outputted from the pre-filter units 104a, 104b are left (x, y) and right (x, y), respectively, and a disparity between the right and left images is expressed as disparity. The sum of differential absolute values block_abs_sum (x, y, disparity) of the 4×4 pixel blocks in the respective left and right images in the output coordinates (x, y) can be expressed as the following Formula (3).

$$\text{block\_abs\_sum}(x, y, \text{disparity}) =$$
$$\sum_{j=0,1,2,3} \sum_{i=0,1,2,3} \text{abs}\{\text{left}(4x + i + \text{disparity}, 4y + j) - \text{right}(4x + i, 4y + j)\}$$

The disparity is continuously changed in units of one pixel in a predetermined range (for example, from 0 to 63) of an outputted image every coordinates (x, y), and a value of the disparity having the smallest sum of differential absolute values block_abs_sum (x, y, disparity) in the 4×4 pixel blocks in the aforementioned Formula is obtained. The obtained value is a disparity which is disparity (x, y).

The merging unit 108 receives the right and left disparity images having undergone the stereo matching and outputs a single merged disparity image. The processing by the merging unit 108 will be described in detail later.

The post-filter unit 110 performs the post-filter processing to eliminate anomaly values of a disparity image obtained by the merging unit 108 and to fill in pixels which have such low reliability that does not enable disparity value calculation. The post-filter unit 110 performs the post-filter processing by using, for example, a median filter.

Figure 4:
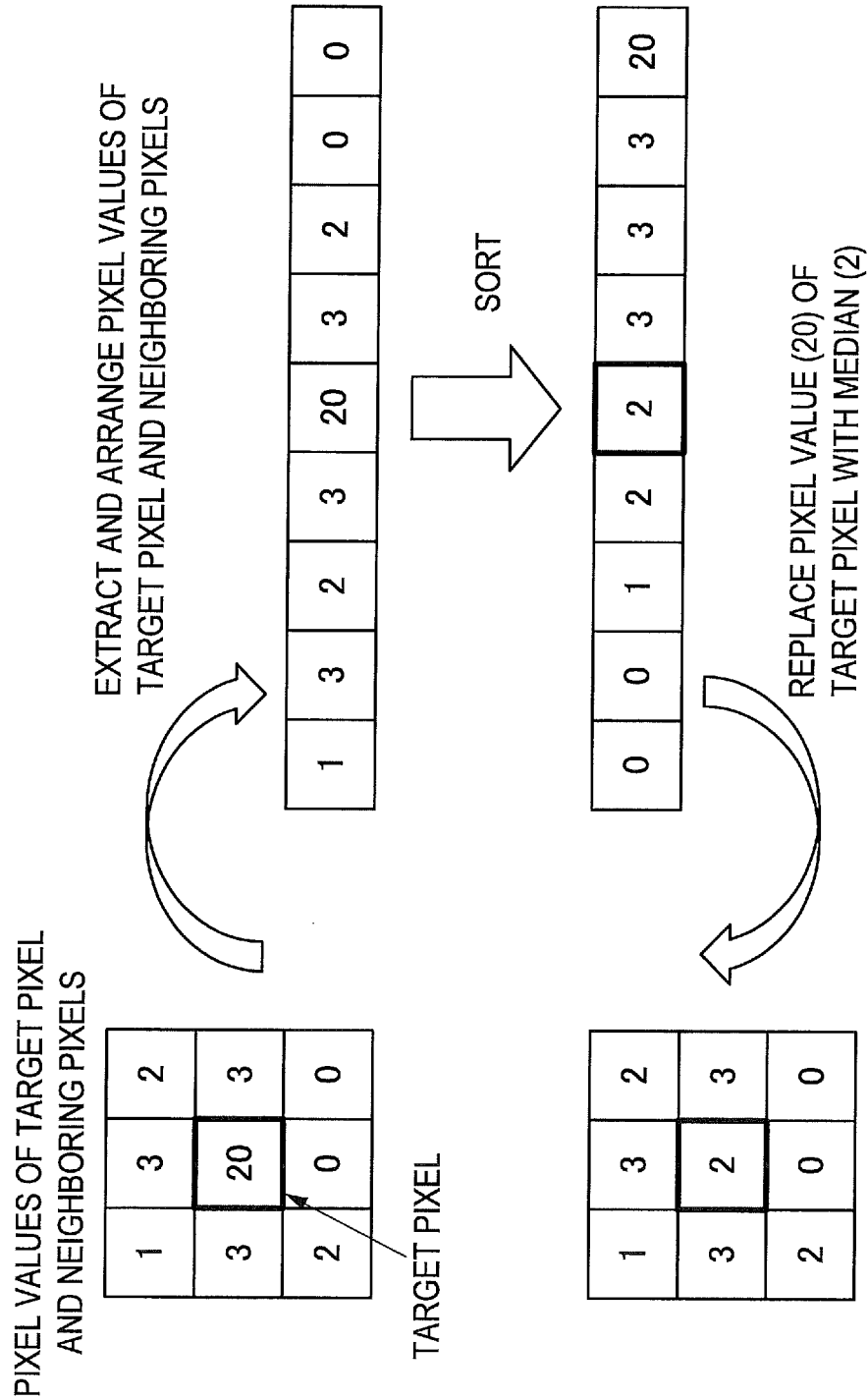
FIG. 4 is a schematic diagram illustrating processing in a case where a post-filter unit is a median filter.

FIG. 4 is a schematic diagram illustrating processing in the case where the post-filter unit 110 is a median filter. As illustrated in FIG. 4, when filtering is performed in a 3×3 pixel region, pixel values of the target pixel and neighboring pixels are extracted, arranged in a row, and a pixel value (20) of the target pixel is replaced with a median (2) of nine pixel values. This makes it possible to eliminate an anomaly value and to fill in a pixel for which disparity value calculation fails.

[1.2. Algorithm Used for Merging Unit]

FIG. 5 is a schematic diagram for explaining a basic concept of algorithm used by the merging unit 108, and illustrates right and left disparity images outputted from the stereo matching unit 106. As described above, the stereo matching unit 106 generates the disparity images based on the respective right and left images. For this reason, mutually corresponding points in the right and left disparity images considered to have similar disparity values. Hence, a disparity value of a target point of one of the right and left disparity images is used to obtain a reference point of the other disparity image which corresponds to the target point, two disparities of the target point and the reference point are compared with each other, and thereby reliability is calculated.

FIG. 6 is a schematic diagram illustrating basic processing by the merging unit 108. FIG. 6 illustrates a case which is a premise of the processing performed by the merging unit 108 according to the present embodiment and in which, based on a disparity of a right disparity image, the disparity is compared with a disparity of the reference point of a left disparity image.

As illustrated in FIG. 6, a position to be referred to (reference pixel) in the left image is calculated from a disparity of a target pixel of the right disparity image (Step S10). Next, a right disparity (disparity of the target pixel) is compared with a left disparity (disparity of the reference pixel) to calculate reliability (Step S12). Then, when the reliability is higher than a predetermined threshold, the disparity of the right disparity image is outputted (Step S14).

FIG. 7 is a schematic diagram for explaining the processing in FIG. 6, and illustrates an example in which a reference pixel in a left disparity image is calculated based on a target pixel of a right disparity image. As illustrated in FIG. 7, the projection conversion or the like results in the same height (position in the vertical direction) of an object taken in right and left disparity images. In this case, the reference pixel can be found on a horizontal line also including the target pixel. When a disparity in a position (xR, yR) in the target pixel of the right disparity image is dR, a position (xL, yL) of the reference pixel in the left disparity image is (xL, yL)=(xR+dR, yR). Accordingly, reliability of a disparity value can be judged by comparing the disparity dR of the target pixel at the position (xR, yR) with the disparity dL of the reference pixel at the position (xL, yL).

Thus, when "the disparity dR of the right target pixel" and "the disparity dL of the left reference pixel" have similar disparity values, the disparity value of the target pixel can be considered to be reliable. In this case, an inverse of an absolute value abs(dR−dL) of a difference between the right and left disparities is used as a value indicating the reliability. Then, abs(dR−dL) is compared with a threshold (threshold_same_disparity) for judging the reliability. In the case of abs(dR−dL)<(threshold_same_disparity), the value of the disparity is reliable, and thus the disparity dR of the target pixel of the right disparity image is outputted as a disparity (merged_disparity) having undergone the merging. In the case of abs(dR−dL)≥(threshold_same_disparity), the value of the disparity is not reliable, and thus "no disparity (=0)" is outputted as the disparity (merged_disparity) having undergone the merging. The following example is conceivable as an example of the algorithm.

--- if(abs(dR-dL) <threshold_same_disparity)
    merged_disparity=dR;
else
    merged_disparity=0;

---

In the aforementioned algorithm, abs(dR−dL) is a value indicating an inverse of a disparity value of reliability, and threshold_same_disparity is a threshold for determining whether dR is reliable. In other words, whether dR and dL are the same disparity can be judged based on the threshold.

Meanwhile, in the method illustrated in FIGS. 6 and 7, disparities are compared with each other on only an only one-to-one basis. When one of the right and left disparities has an anomaly value, a value of the disparity is judged as not reliable. For this reason, many anomaly values of the disparities in the right and left disparity images lead to many pixels having the disparity of 0 after the merging, and the disparity image after the merging have many blank spaces.

Hence, in an embodiment, before determining a position of a reference pixel, the disparity images undergo the post-filter processing to eliminate anomaly values in advance. This can increase an effective region at the time of mutual reference between a target pixel of a right disparity image and a reference pixel in a left disparity image. The median filter is used as the post filter.

FIG. 8 illustrates processing including the post-filter processing according to the present embodiment. The post-filter processing unit 107 for the right and left disparity images is added to the processing in FIG. 6. As described above, including the post-filter processing provides an effect of eliminating anomaly values, and the disparity of 0 after the merging can be minimized.

In addition, to reduce processing time, the post-filter processing can be performed on only an image which is a disparity reference source. FIG. 9 illustrates an example where the post-filter processing is performed only on a right disparity image which is the reference source. After the post-filter processing is performed on the right disparity image which is the reference source, a disparity of a target pixel of the reference source and a disparity of a corresponding pixel in a reference target are compared with each other to calculate reliability, and a disparity after the merging is determined. This can implement high speed processing, because the post-filter processing is performed on only one of the right and left disparity images. However, many disparity anomaly values might remain in the left disparity image which is the reference target, and thus a method for calculating reliability in merging is desirably devised to leave many effective disparity values after the merging.

For this reason, as illustrated in FIG. 10, a disparity dR of a right target pixel is compared with each of disparities dL[i] (i=0, ..., 8) of nine pixels neighboring and including a left reference pixel, and reliability of dR is determined. For example, pixels having a disparity value similar to a disparity value of the target pixel of a reference source in the 3×3 pixels neighboring and including the reference pixel are counted, and the counted value is compared for the reliability with the threshold. The following shows the algorithm in this case.

```
Int count=0;
    for (int i=0; i < 9; i++) {
        if(abs(dR-dL[i])<threshold_same_disparity)
            count++;
    }
    if (count>= threshold_count)
        merged_disparity=dR;
    else
        merged_disparity=0;
```

In the algorithm, threshold_same_disparity is a threshold for judging whether dR is a disparity similar to that of dL[i], and count is a value indicating how many disparities similar to that of dR exist adjacent to the reference pixel and indicating the reliability. In the algorithm, when the reliability is smaller than or equal to the threshold, the disparity value is regarded as an uncertain value (unknown value) and thus assigns "0".

Figure 11:
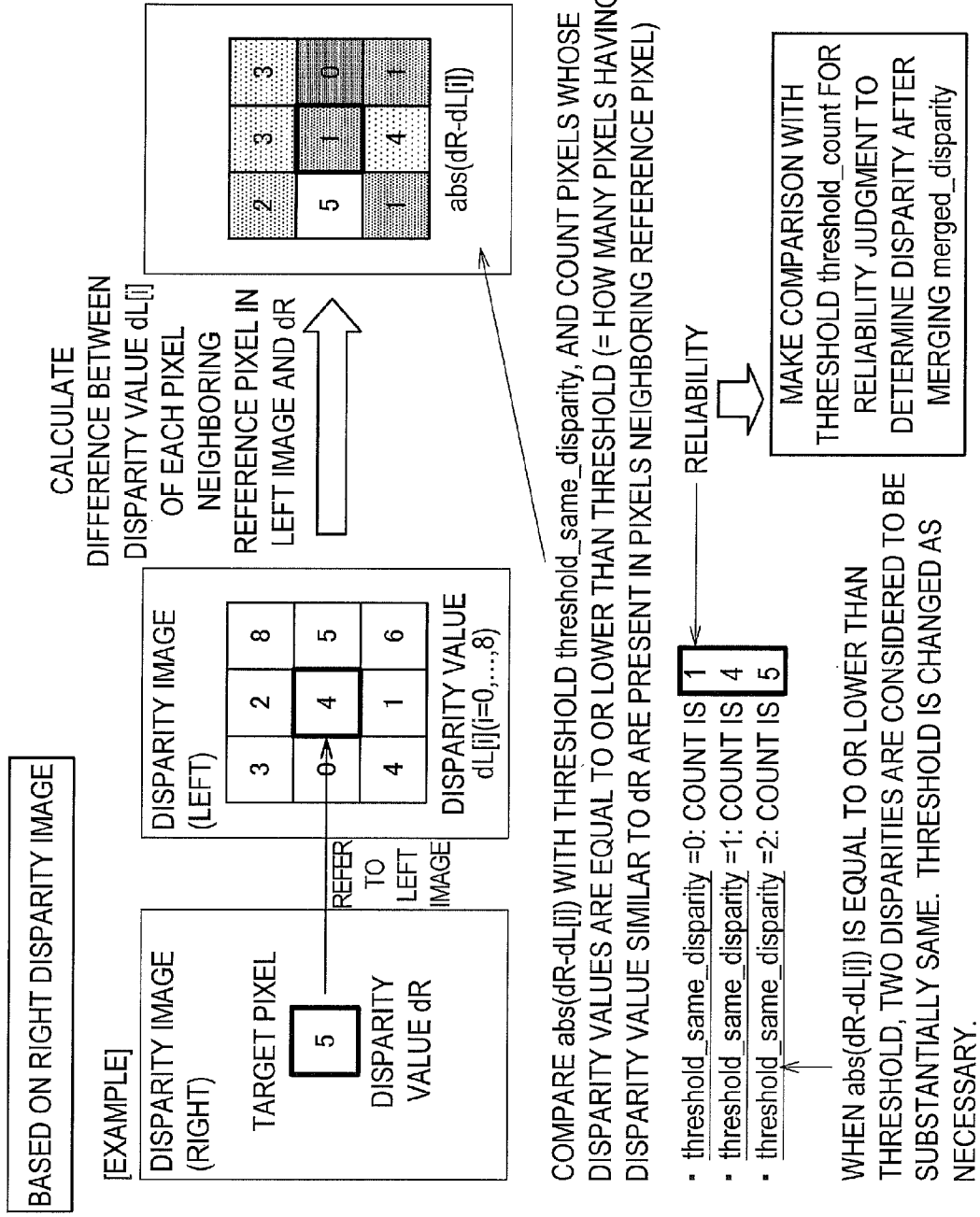
FIG. 11 is a schematic diagram illustrating processing in FIG. 10 in detail.

FIG. 11 is a schematic diagram illustrating in detail the processing in FIG. 10 and the algorithm described above. A disparity dR of the target pixel of the right disparity image is compared in turn with each of the reference pixel in the left disparity image and disparities dL[i] (i=0, ..., 8) of eight pixels neighboring the reference pixel, and calculates a difference abs(dR−dL[i]) between the disparity dR and each of the left reference pixel and disparity value dL[i] (i=0, ..., 8).

Then, abs(dR−dL[i]) is compared with the threshold threshold_same_disparity, and pixels having values equal to or lower than the threshold are counted (how many pixels having the same disparity value as dR around the reference pixel are present). Then, the disparity merged_disparity after the merging is determined based on the count value. As illustrated in FIG. 11, the threshold is changed as necessary. When abs(dR−dL[i]) is equal to or lower than threshold, the disparity of the target pixel dR and the disparity of the reference pixel dL are regarded as substantially the same.

Figure 12:
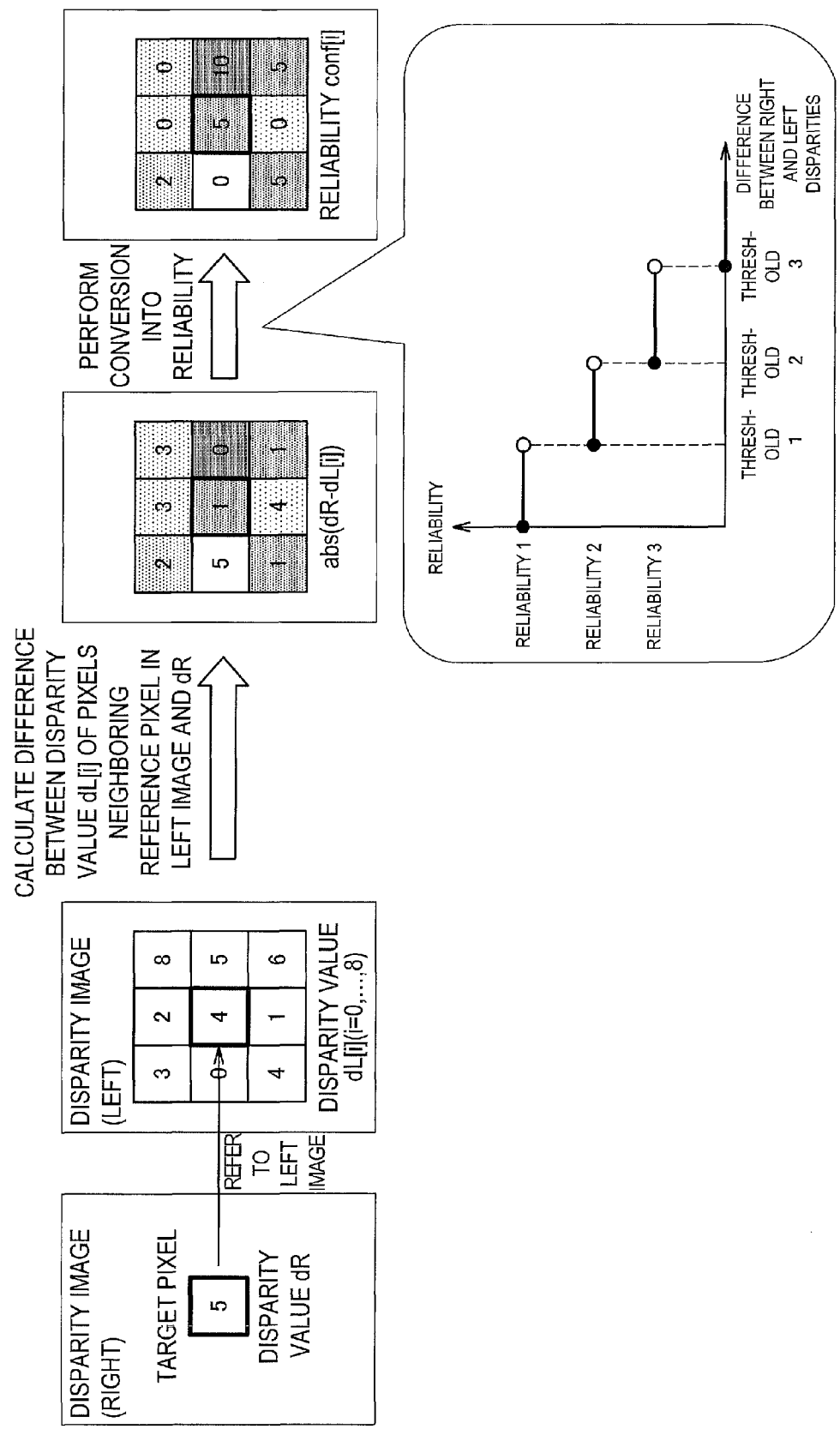
FIG. 12 is a schematic diagram illustrating a method by which a position of a left reference pixel is obtained from a disparity value dR of a right target pixel and thereafter the reliability of the disparity value dR is determined while a difference between dR and each of the disparity values dL[i] (i=0, . . . 8) neighboring the reference pixel is weighted.

FIG. 12 is a schematic diagram illustrating a method by which the position of the left reference pixel is obtained from the disparity value dR of the right target pixel, differences between each disparity value dL[i] (i=0, ... 8) neighboring the reference pixel and dR are weighted, and thereby reliability is determined. The difference abs(dR−dL [i]) between the disparity dR and each of the left reference pixel and the disparity value dL[i] (i=0, ..., 8) is calculated in the same manner as in the processing in FIG. 11. In FIG. 12, a step-shaped transfer function indicating a relationship between reliability and a difference between the right and left disparities is used to convert the difference abs(dR−dL [i]) between the right and left disparities into reliability based on the transfer function, and a value obtained by adding these is used as a reliability conf[i] of the target pixel. When a threshold 1 in FIG. 12 is 1; a threshold 2, 2; a threshold 3, 3; a reliability 1, 10; a reliability 2, 5; and a reliability 3, 2, the reliability conf(x, y) of the target pixel in FIG. 12 is conf(x, y)=conf+conf+ ... +conf=27.

Accordingly, it is possible to judge reliability of a disparity based on the reliability conf[i].

According to the first embodiment as described above, the post-filter processing is performed on the right and left disparity images before merging the disparity images having undergone the stereo matching, and thus it is possible to in advance eliminate anomaly values of the disparities in the disparity images. This can increase an effective region at the time of mutual reference between the target pixel of the right disparity image and the reference pixel in the left disparity image, and thus can minimize a disparity of 0 (no disparity) after the merging.

<2. Second Embodiment>

Next, a second embodiment of the present disclosure will be described. In the second embodiment, a plurality of resolutions are inputted to generate disparity images.

In the second embodiment, a basic processing flow is the same as that in the first embodiment illustrated in FIG. 1. In the second embodiment, the stereo matching unit 106 uses input images respectively having a plurality of resolutions.

[2.1. Relationship Between Distance from Object and Resolution]

Figure 13:
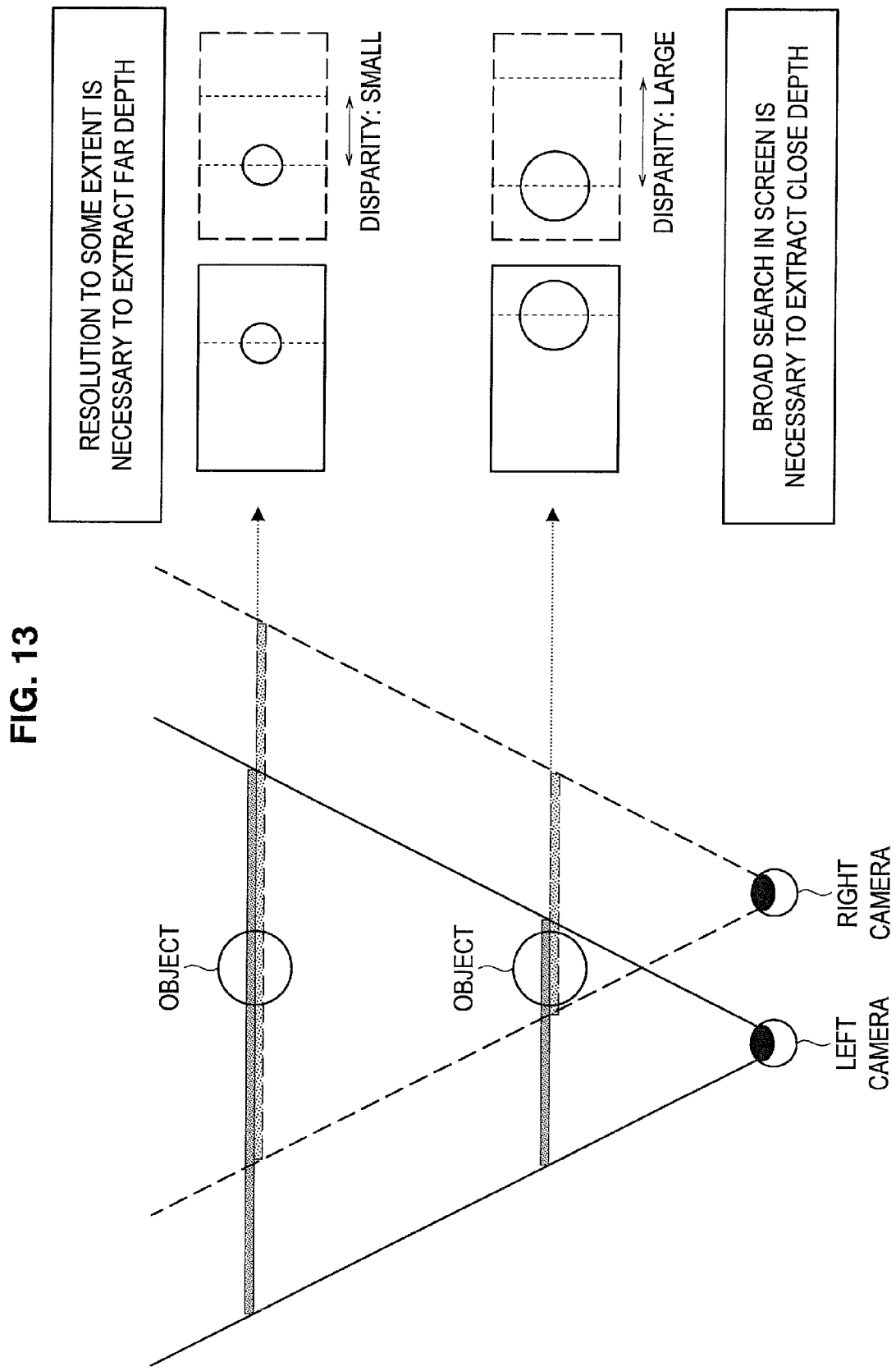
FIG. 13 is a schematic diagram illustrating positions of objects and right and left cameras, the objects being subjects of the right and left cameras.

FIG. 13 is a schematic diagram illustrating positions of right and left cameras and objects which are subjects. As illustrated in FIG. 13, the object close to the cameras has a large disparity, while the object far from the cameras has a small disparity. As illustrated in FIG. 13, the object relatively far from the cameras have a small disparity. For this reason, it is necessary to use a high resolution to some extent to extract a distance in a depth direction after matching performed by the stereo matching unit 106.

In contrast, the object relatively close to the cameras has a large disparity. For this reason, it is necessary to search a large plane of an image to extract a distance (depth) in the depth direction after the matching performed by the stereo matching unit 106.

Since the objects close to and far from the cameras have different disparities as described above, a fixed search range in matching causes a difference in a obtainable disparity, depending on a resolution of an input image. As illustrated in a left part of FIG. 14, a larger resolution enables searching in a finer range and thus search for a small disparity. This enables a depth of an object far the cameras to be extracted.

Figure 14:
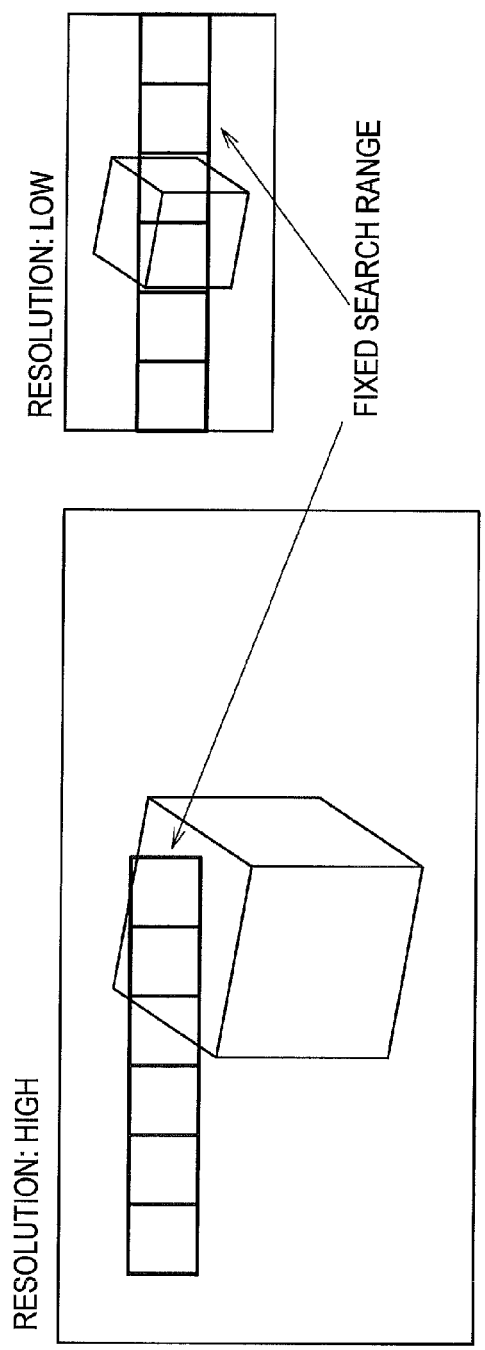
FIG. 14 is a schematic diagram for explaining a search range based on a resolution.

In contrast, as illustrated in a right part of FIG. 14, a smaller resolution enables a larger area to be searched in the case of the same object. This enables a large disparity to be searched for and a depth of an object close to the cameras to be extracted.

Figure 15:
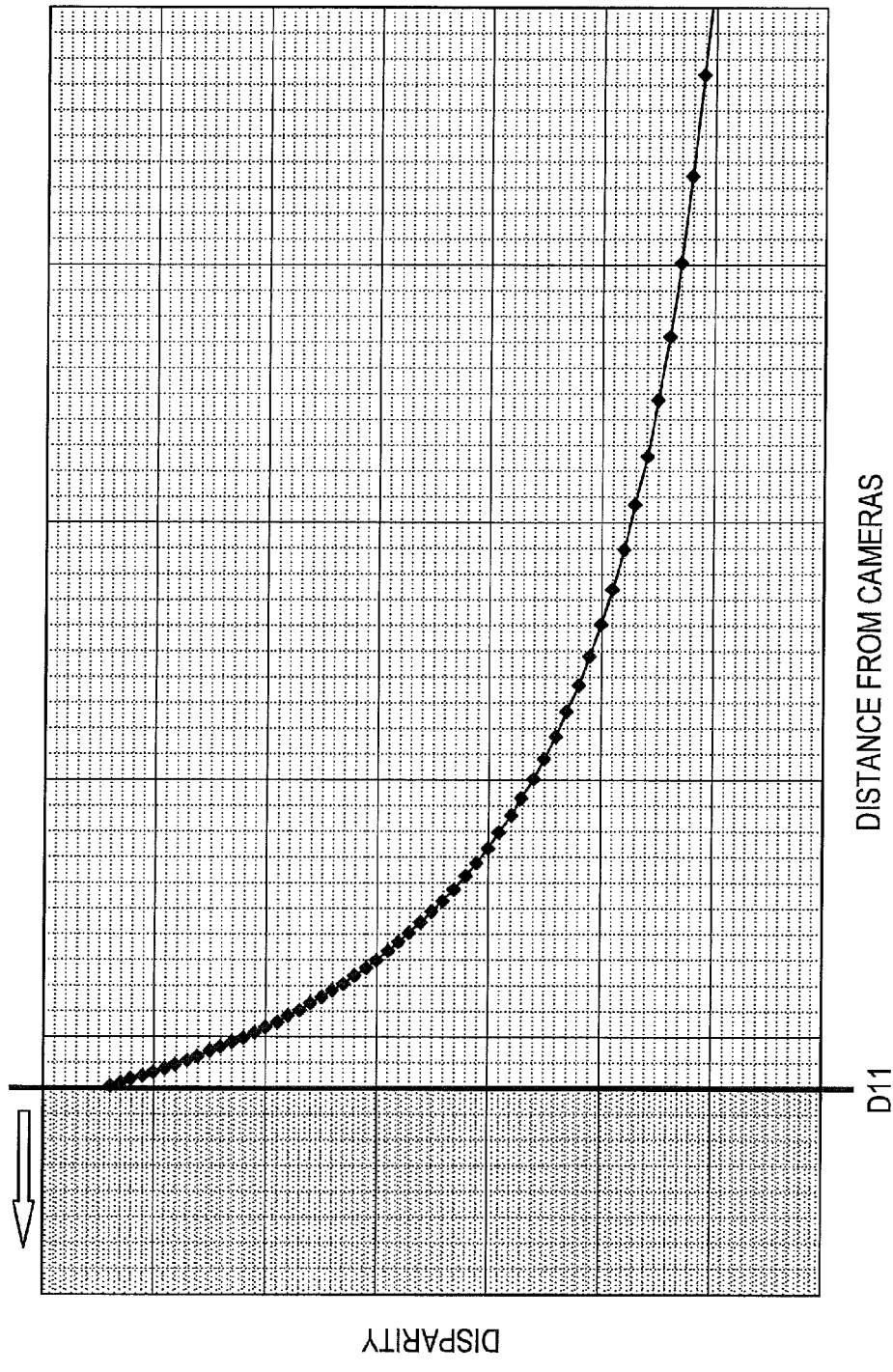
FIG. 15 is a schematic diagram illustrating a relationship between a resolution of an image and an inferable depth.
Figure 16:
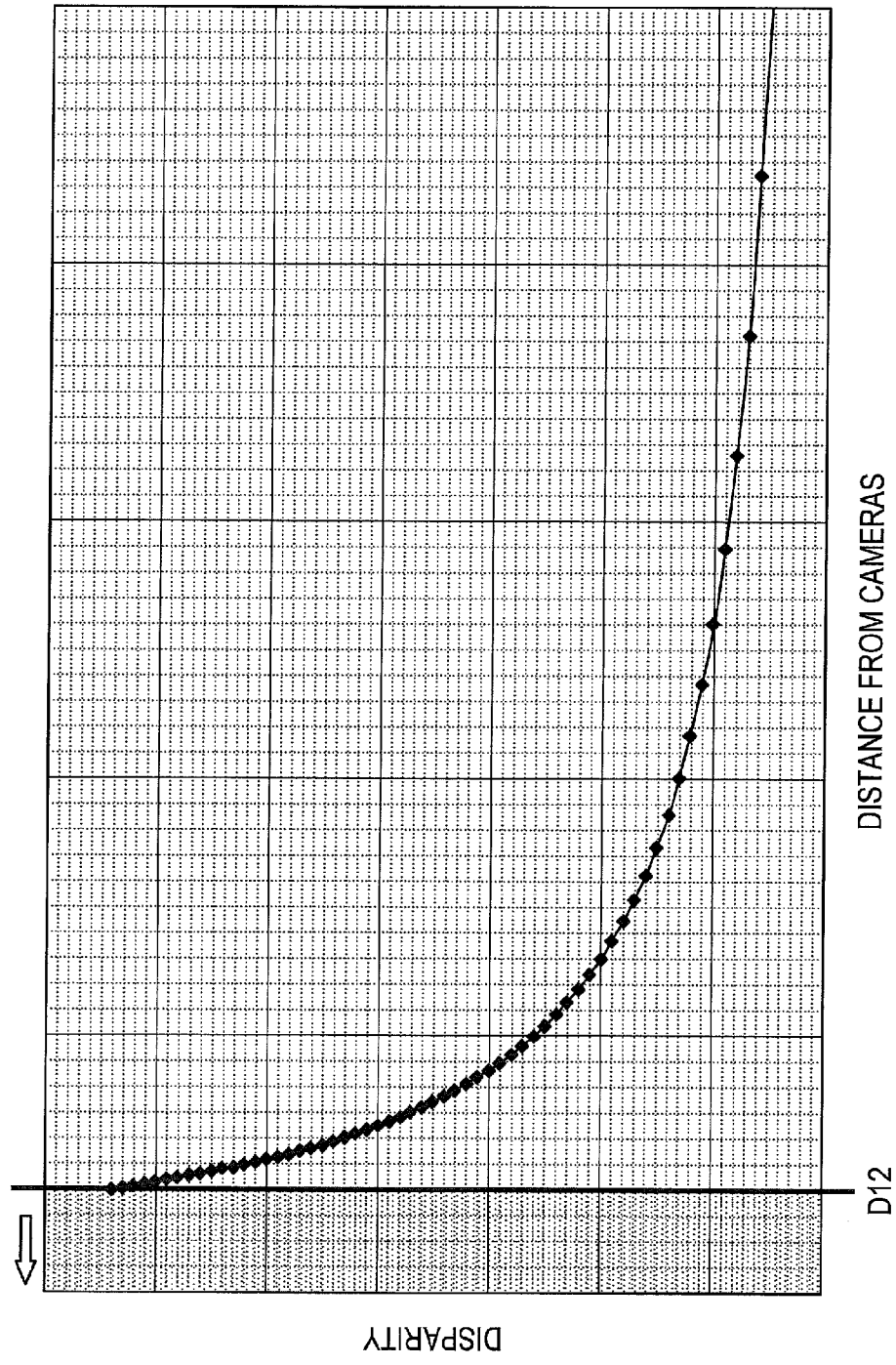
FIG. 16 is a schematic diagram illustrating a relationship between a resolution of an image and an inferable depth.
Figure 17:
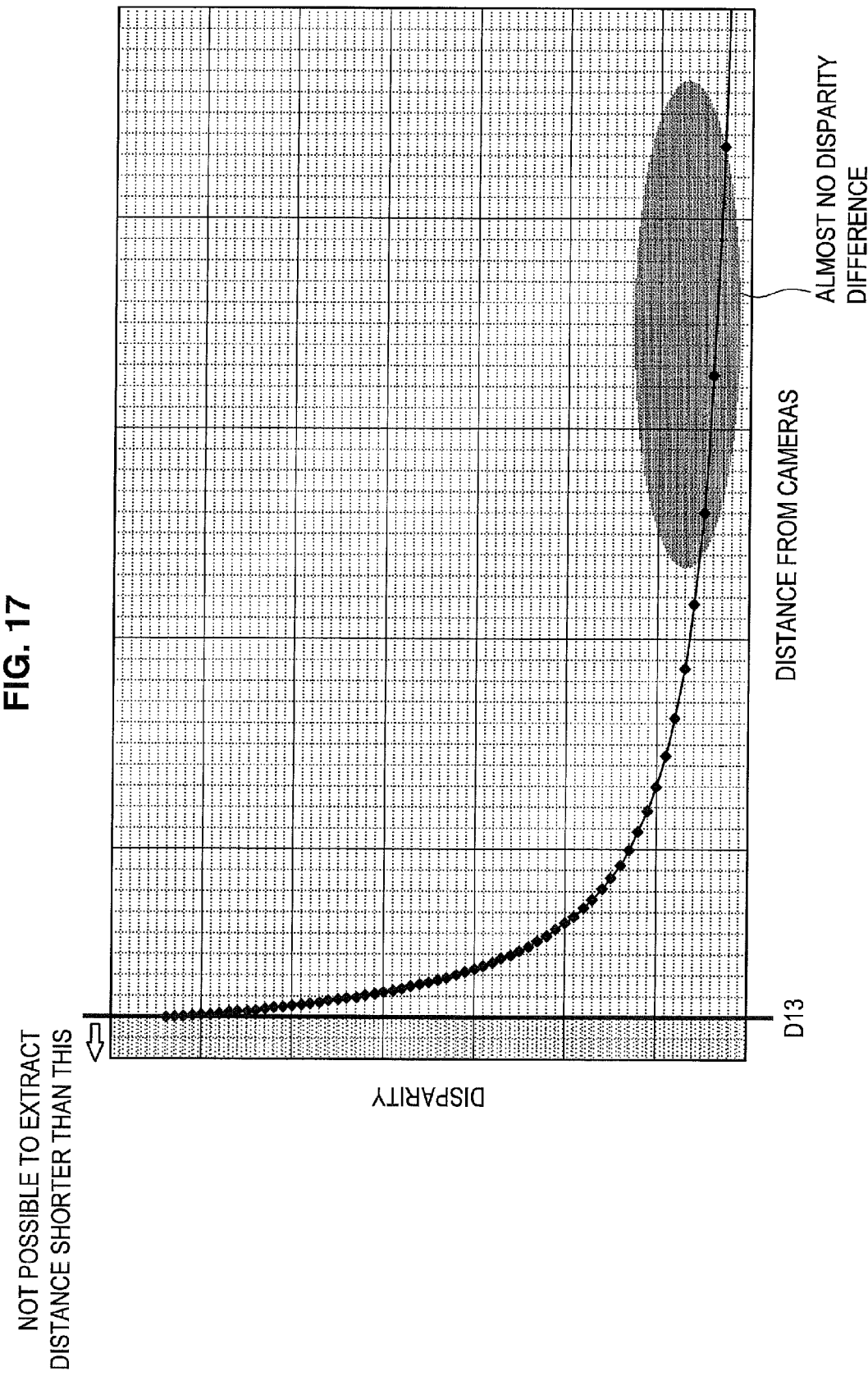
FIG. 17 is a schematic diagram illustrating a relationship between a resolution of an image and an inferable depth.

FIGS. 15 to 17 are each a schematic diagram illustrating a relationship between an image resolution and an inferable depth. FIG. 15 illustrates a case of an image size of 640×480 and 64 pixel searching. In this case, a distance of D11 or shorter from the cameras makes it difficult to infer a depth.

FIG. 16 illustrates a case of an image size of 320×240 and 64 pixel searching. In this case, a distance of D12 or shorter from the cameras makes it difficult to infer a depth, the distance of D12 being shorter than D11. FIG. 17 illustrates a case of an image size of 160×120 and 64 pixel searching. In this case, a distance of D13 or shorter from the cameras makes it difficult to infer a depth, the distance of D13 being shorter than D12. As described above, it can be learned that a lower resolution enables inference of a depth of a closer object.

In the second embodiment, the characteristics described above are utilized. Images in respective plurality of resolutions are inputted, and pieces of disparity information are merged for the respective resolutions. This enables scalable extraction of a disparity without increasing processing cost. This enables minimization of a region for which a disparity is not acquired in the images.

[2.2. Specific Example of Merging Plurality of Resolutions]

Figure 18:
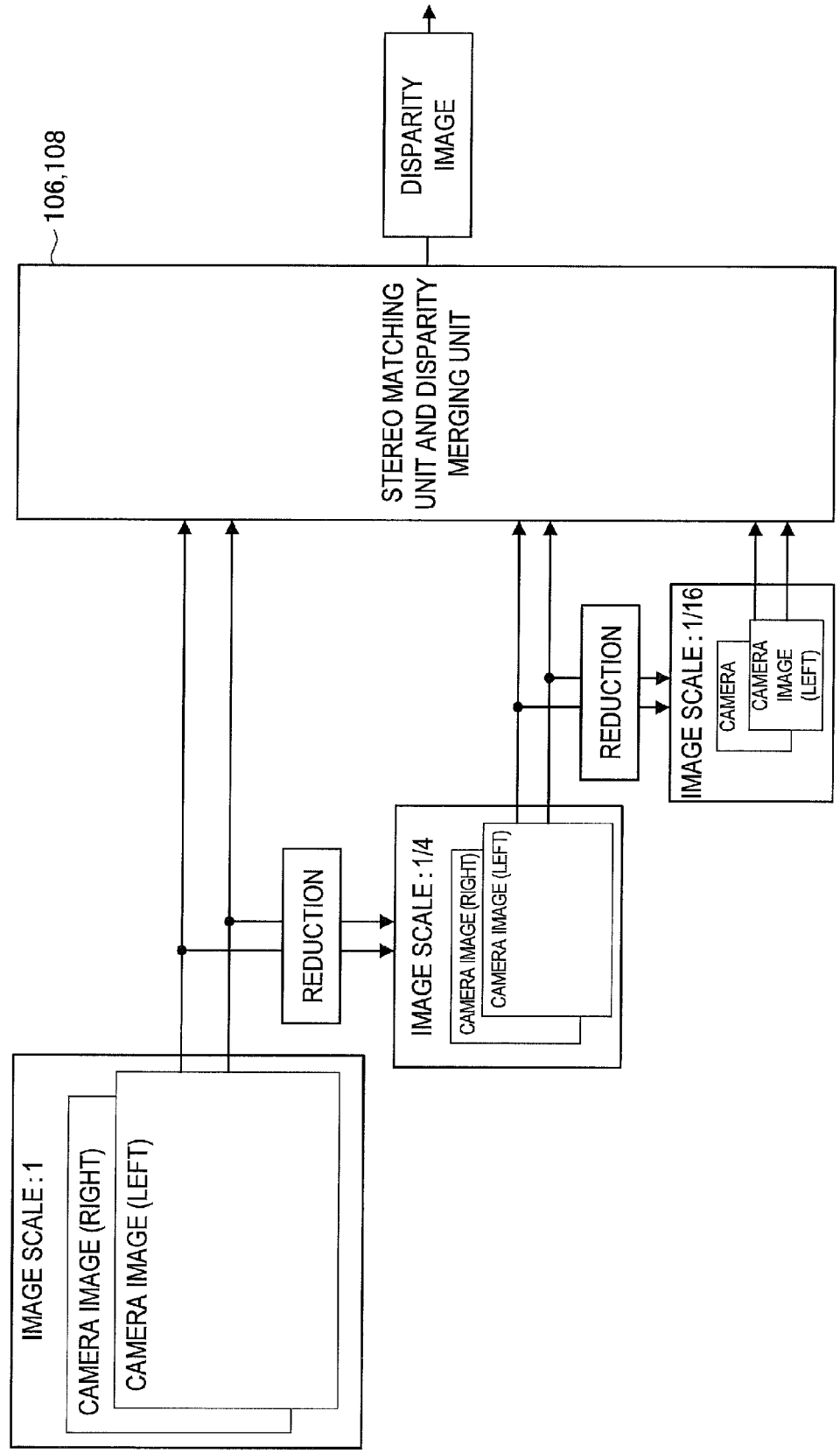
FIG. 18 is a schematic diagram illustrating processing in a case of using a plurality of resolutions in a second embodiment.

FIG. 18 is a schematic diagram illustrating the processing using a plurality of resolutions in the second embodiment. FIG. 18 illustrates the stereo matching unit 106 and the merging unit 108 as an integrated block. As for the projection conversion units 102*a*, 102*b*, the pre-filter units 104*a*, 104*b*, the post-filter unit 110, and the back-projection conversion unit 112, illustration thereof is omitted. The stereo matching unit 106 and the merging unit 108 perform the stereo matching and the merging on each of the plurality of resolutions.

As illustrated in FIG. 18, an original resolution (an image scale) of right and left camera images is assumed to be "1". The images in the image scale "1" are reduced to ¼, so that images in the image scale "¼" are generated. Further, the images in the image scale "¼" are reduced to ¼, so that images in the image scale "1/16" are generated. Then, the right and left camera images in the image scales "1", "¼", and "1/16" are inputted into the stereo matching unit 106.

Figure 19:
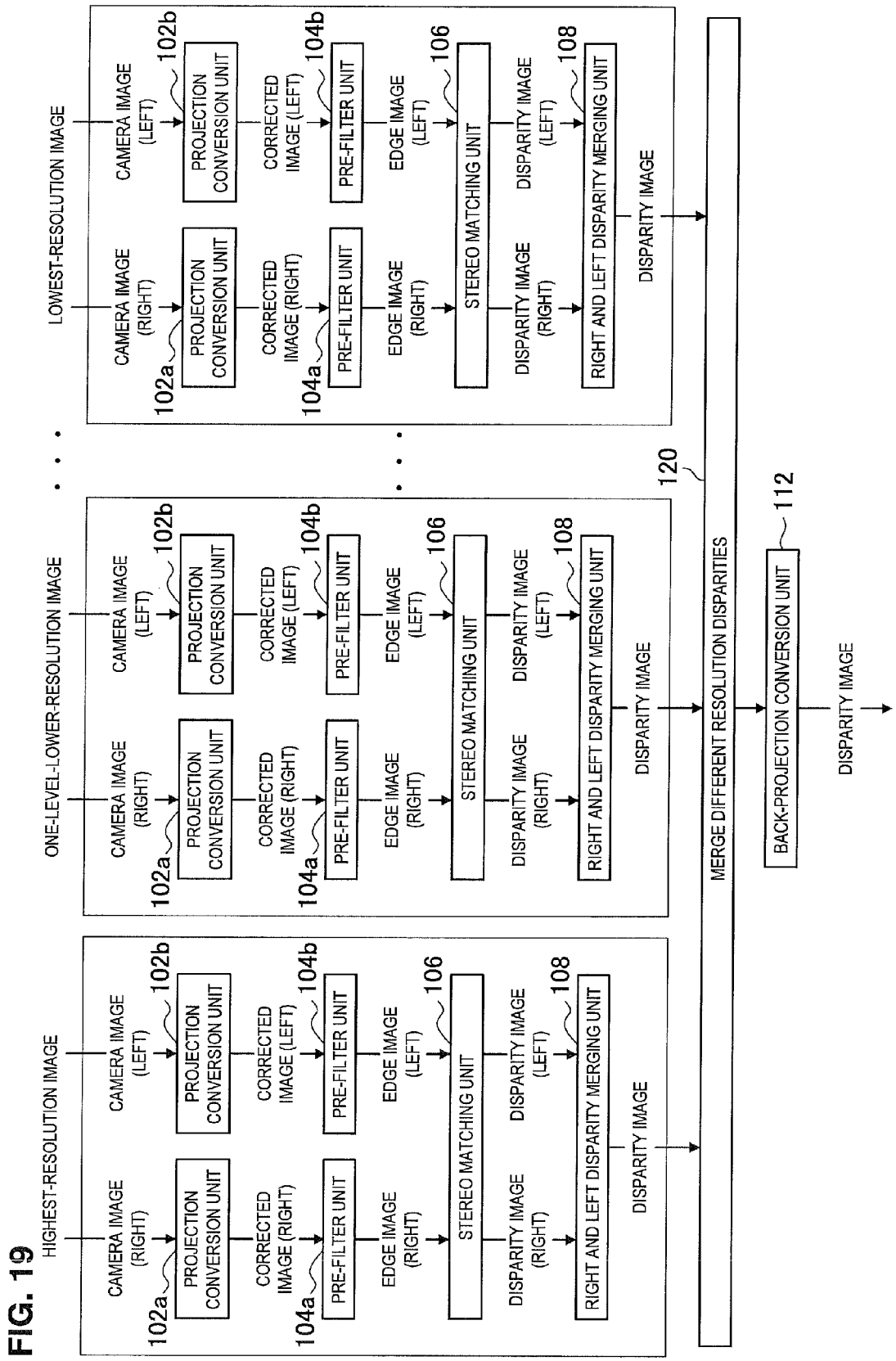
FIG. 19 illustrates: a projection conversion unit, a pre-filter unit, and a back-projection conversion unit added to a configuration in FIG. 18; and a stereo matching unit and a merging unit which are provided as separate blocks.

FIG. 19 illustrates: the projection conversion units 102*a*, 102*b*, the pre-filter units 104*a*, 104*b*, and the back-projection conversion unit 112 which are added to the configuration in FIG. 18; and the stereo matching unit 106 and the merging unit 108 shown as separate blocks. The projection conversion units 102*a*, 102*b*, the pre-filter units 104*a*, 104*b*, the stereo matching unit 106, and the merging unit 108 are provided for each of the plurality of resolutions. Then, a merged_disparity image outputted from the merging unit 108 having the corresponding resolution is inputted to the merging unit 120 configured to merge disparities having different resolutions. As described above, the same configuration as in FIG. 1 is provided for each of a "highest-resolution image", a "one-level-lower-resolution image", and a "lowest-resolution image". Here, the "highest-resolution image" corresponds to the images in the image scale "1" in FIG. 18; the "one-level-lower-resolution image", the images in the image scale "¼" in FIG. 18; and the "lowest-resolution image", the images in the image scale "1/16" in FIG. 18.

Each merging unit 108 merges right and left disparities for a corresponding one of the "highest-resolution image", the "one-level-lower-resolution image", and the "lowest-resolution image", and inputs results into the merging unit 120. Note that an anomaly value can be eliminated by applying the post filter to the disparity images for each of the "highest-resolution image", the "one-level-lower-resolution image", and the "lowest-resolution image" before the input to the merging unit 108.

As illustrated in FIG. 19 in the algorithm using the plurality of resolutions in the second embodiment, the input images in the plurality of resolutions are prepared as described above, each of the input images in the plurality of resolutions undergoes the stereo matching by the stereo matching unit 106, and thereby the disparity images are obtained. This processing of obtaining the disparity images can be performed in parallel for the input images having the plurality of resolutions.

Figure 20:
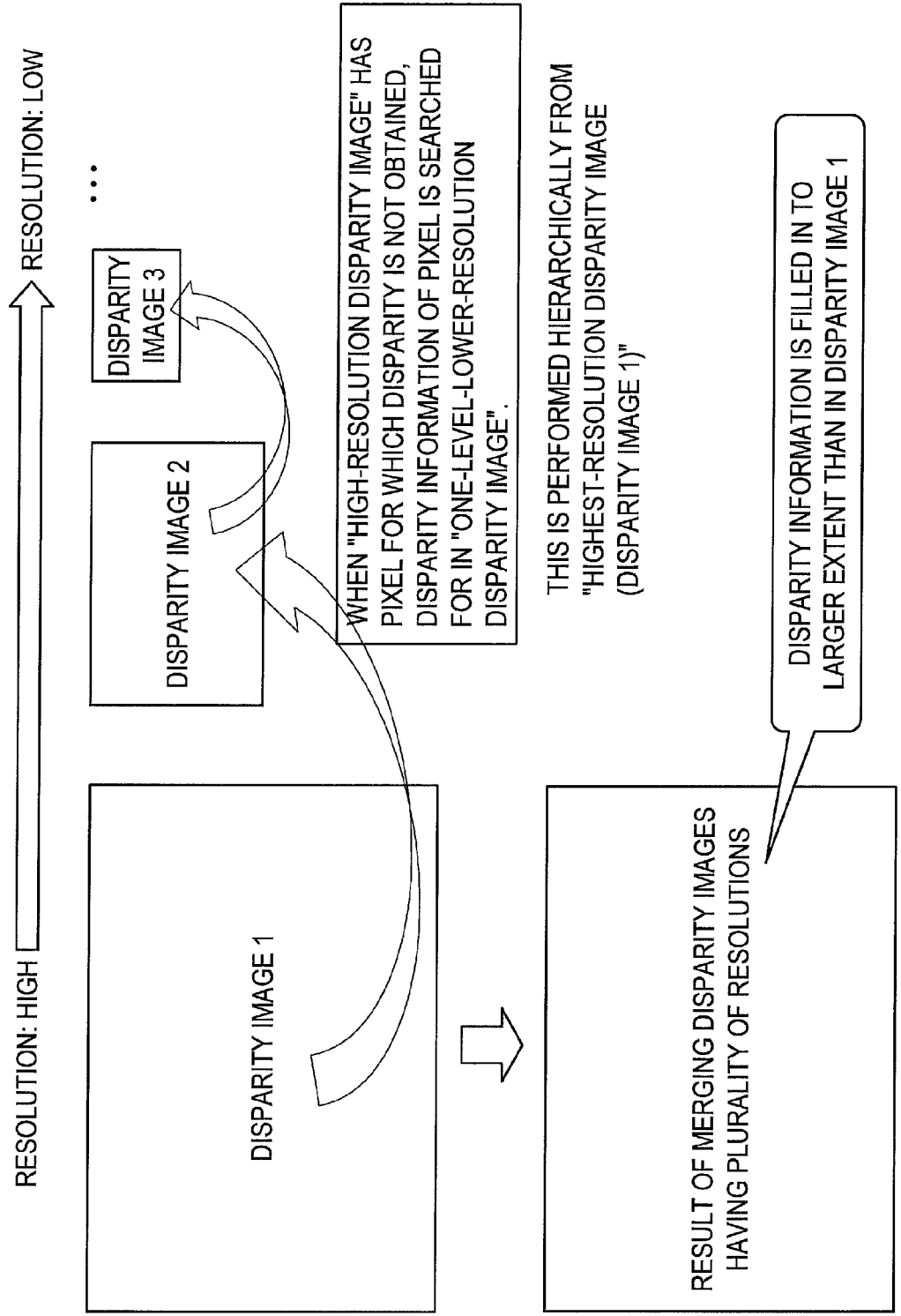
FIG. 20 is a schematic diagram for explaining processing by the merging unit.

FIG. 20 is a schematic diagram for explaining the processing by the merging unit 120. Firstly, for a part having a disparity value (disparity value≠0) in a highest-resolution disparity image 1, the disparity value is used. As for a part having no disparity value (disparity value=0), fill-in processing is performed by using a disparity value in a one-level-lower-resolution disparity image 2. Further, if the disparity image 2 does not have the disparity value, either, fill-in processing is performed by using a disparity value in a further-one-level-lower-resolution disparity image 3. When a disparity value is not obtained in a lowest-resolution disparity image after repeating such processing, a processing target part is considered to have "no disparity value". This can minimize regions judged as "no disparity" in the disparity image 1.

As described above, when a disparity is not obtained in a "high-resolution disparity images", searching is performed on an "only-one-level-lower-resolution disparity image" for disparity information of the pixel. When, the disparity information is present, the disparity information is used. Such processing is performed hierarchically from the "highest-resolution disparity image (disparity image 1)". This can minimize the regions judged as "no disparity".

Here, a part having no disparity value in each image is considered to be an occlusion region or a texture-less region. Since a disparity value is not obtained by nature in the occlusion region (a region in which a front object hides a back object), it is not necessary to obtain a disparity value by using a low resolution image. For this reason, the following methods are used to prevent the processing using the low-resolution image from being performed in the occlusion region.

In the first method, reliability of each disparity is calculated in advance at the time of the stereo matching, and this is used as an index. Specifically, when the disparity has low reliability, the processing using a low-resolution image is prevented from being performed. Examples of the index include a luminance distribution of a camera image (presence or absence of texture). This method uses the reliability calculated at the time of the stereo matching, as the index at the time of merging a plurality of resolutions. In an example of using the luminance distribution, the sum of luminance values in a block of an edge image is used. For example, suppose a case where the matching is performed in a 4×4 block. Where a luminance value of the edge image with coordinates (x, y) is lum (x, y), the sum of the luminance values in the block can be expressed as the following Formula (4). This value can be used for judging the presence or absence of an edge.

$$\text{block\_lum\_sum}(x, y) = \sum_{j=0,1,2,3} \sum_{i=0,1,2,3} lum(4x + i, 4y + j)$$

Figure 21:
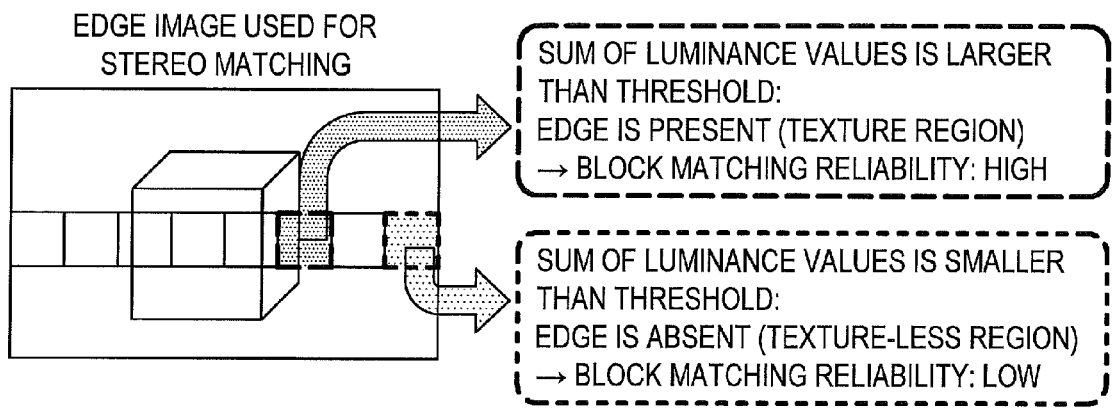
FIG. 21 is a schematic diagram illustrating a method for judging the block matching reliability based on the sum of luminance values.

As illustrated in FIG. 21, when the sum of the luminance values is larger than a predetermined threshold, it is judged that an edge is present (texture region) and thus that the block matching reliability is high. In contrast, when the sum of the luminance values is smaller than a predetermined threshold, it is judged that the edge is absent (a texture-less region) and thus that the block matching reliability is low. Accordingly, when the block matching reliability is high, it is possible to perform processing while preventing a disparity value using a low-resolution disparity image from being obtained.

The second method uses an existing occlusion detection method as described in the following two literatures. A judgment as an occlusion region leads to a judgment as high block matching reliability, and it is possible to perform processing while preventing a disparity value using a low-resolution disparity image from being obtained.

(Literature 1) A Cooperative Algorithm for Stereo Matching and Occlusion Detection
By Zitnick, C., Kanade, T.
Tech Report CMU-RI-TR-99-35 (1999)
(Literature 2) Real-Time Correlation-Based Stereo Vision with Reduced Border Errors
By Hirschmuller, H., Innocent, P. R., Garibaldi, J. M.
In International Journal of Computer Vision, vol. 47 (1/2/3), pp. 229-246. (2002)

Figure 22:
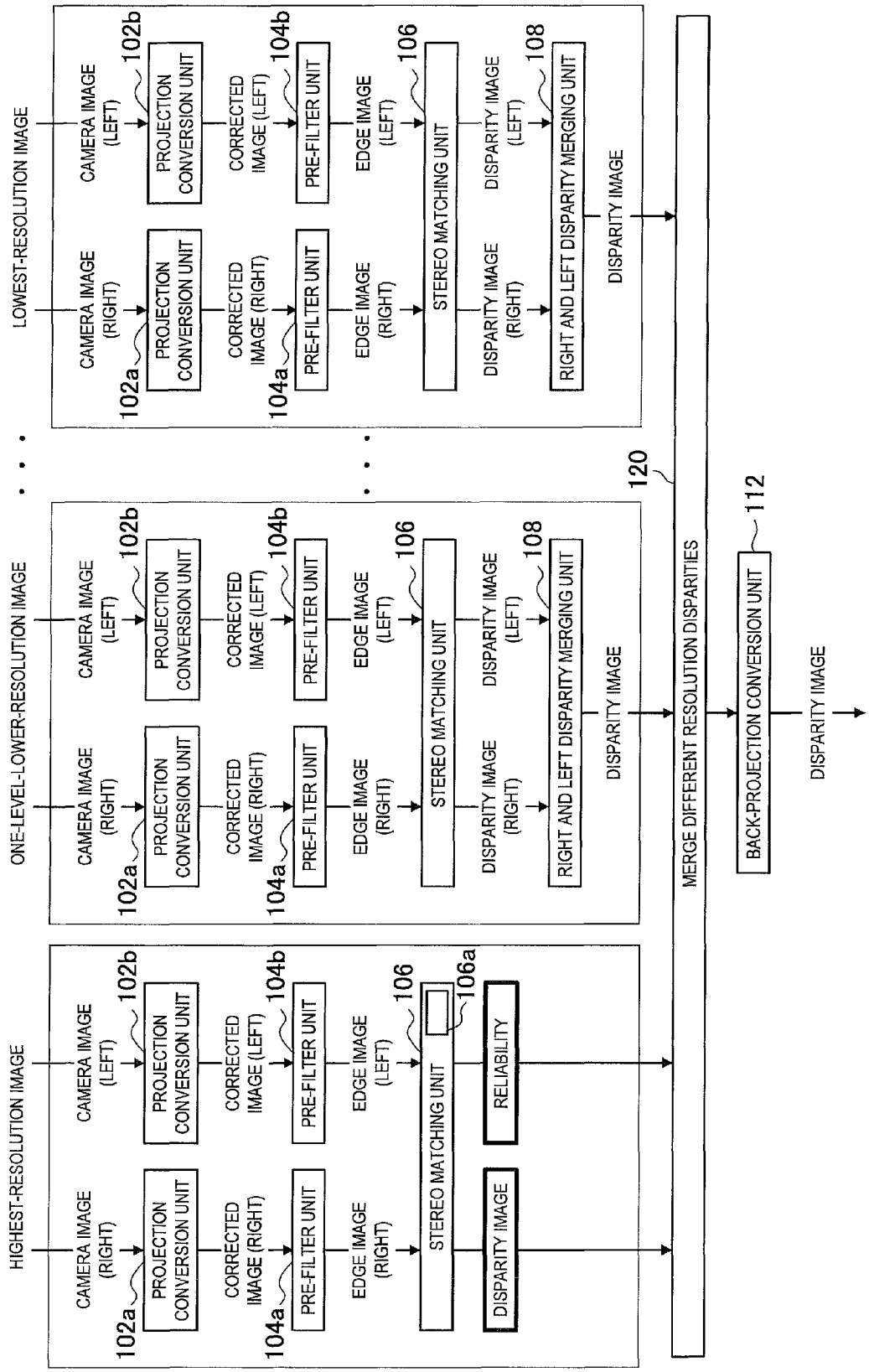
FIG. 22 is a schematic diagram illustrating a configuration in which the stereo matching unit obtains stereo matching reliability and outputs information on the reliability together with a disparity image.

FIG. 22 illustrates a configuration in which one of the stereo matching units 106 obtains stereo matching reliability and outputs reliability information together with a disparity image. As illustrated in FIG. 22, the stereo matching unit 106 that outputs a disparity image from the highest-resolution image includes a reliability calculation unit 106a. The reliability calculation unit 106a calculates the stereo matching reliability by any of the aforementioned methods and outputs the stereo matching reliability.

Figure 23:
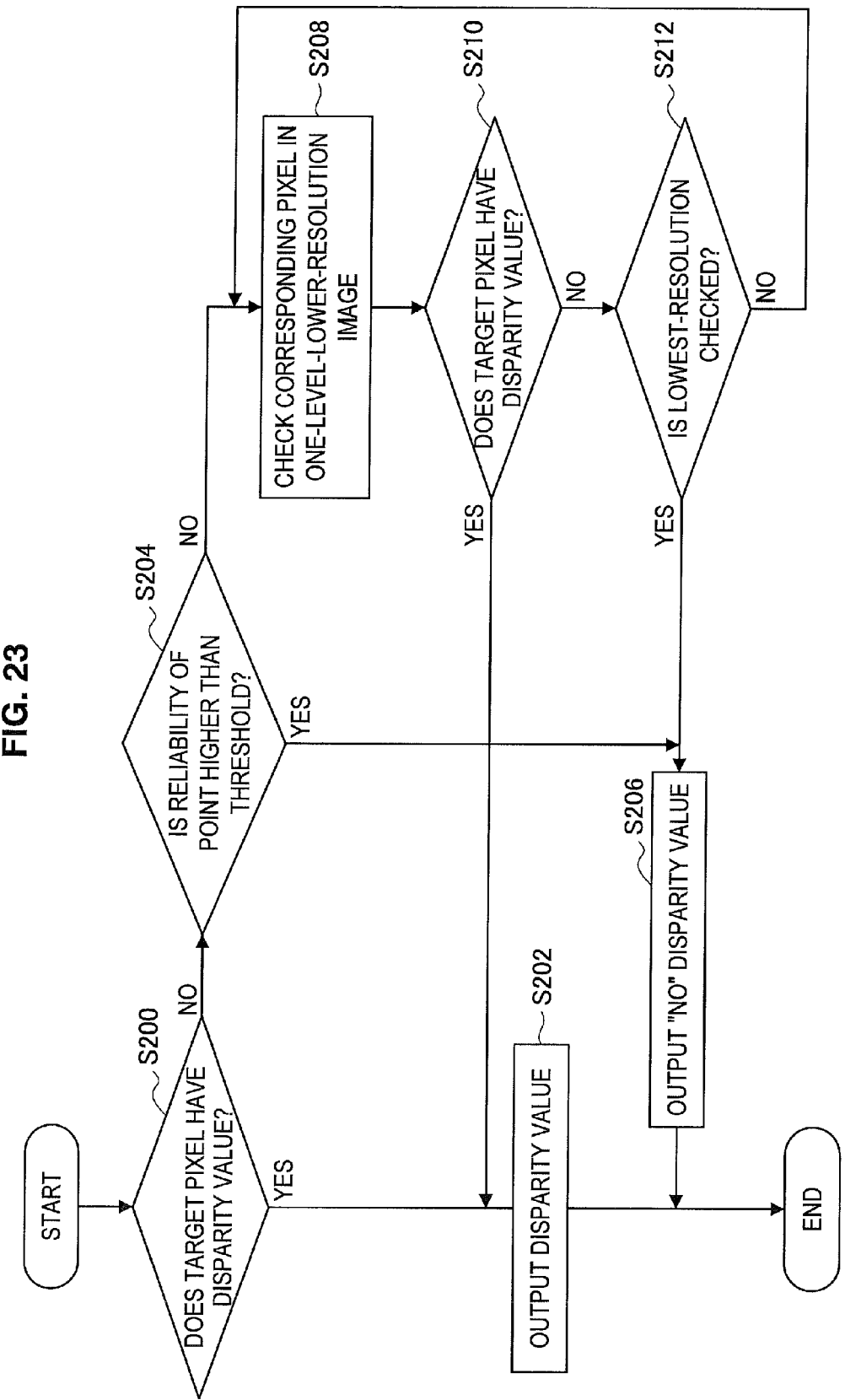
FIG. 23 is a flowchart illustrating processing of merging different resolution disparities based on reliability of a disparity value.

FIG. 23 is a flowchart illustrating processing of merging disparities having different resolutions, based on disparity value reliability. Firstly in Step S200, it is judged whether a target pixel has a disparity value. When the target pixel has a disparity value, the processing proceeds to Step S202 to output the disparity value. On the other hand, when the target pixel does not have the disparity, the processing proceeds to Step S204 to judge whether the target pixel has high reliability.

When the target pixel has the high reliability in Step S204, the processing proceeds to Step S206. Here, "high reliability" means high probability of an occlusion region or a texture region. Accordingly, "no" disparity value is outputted in Step S206. On the other hand, when the target pixel does not have high reliability in Step S204, the processing proceeds to Step S208. In Step S208, a corresponding target pixel in a one-level-lower-resolution image is checked. After Step S208, the processing proceeds to Step S210.

In Step S210, whether the target pixel has a disparity value is checked in the one-level-lower resolution image. When the target pixel has a disparity value, the processing proceeds to Step S202 to output the disparity value. On the other hand, when the target pixel does not have a disparity value, the processing proceeds to Step S212 to judge whether to have checked a disparity in the lowest-resolution disparity image.

When it is judged that the disparity value has been checked in the lowest-resolution disparity image in Step S212, the processing proceeds to Step S206 to output "no" disparity value. On the other hand, it is judged that the disparity value has not been checked yet in the lowest-resolution disparity image in Step S212, the processing moves back to Step S208 to judge whether the target pixel has a disparity value in the one-level-lower resolution image.

According to the processing in FIG. 23 as described above, when the target pixel has high reliability, it is possible to output the disparity value "absent" without checking the one-level-lower-resolution disparity image, the output depending on the reliability. Thus, for a region from which a disparity value is not extracted by nature such as an occlusion region, the disparity value is not extracted by using a low-resolution disparity image, and thus the processing can be simplified. Also for a texture region, its high reliability makes it possible to output the "no" disparity value without checking a one-level-lower-resolution disparity image.

FIGS. 24 to 29 are schematic diagrams for explaining the processing in the second embodiment. With reference to FIGS. 24 to 29, a description is given of the processing using a highest-resolution disparity image 1, a disparity image 2 having a resolution one level lower than that of the disparity image 1, and a disparity image 3 having a resolution further one level lower than that of the disparity image 2.

Figure 24:
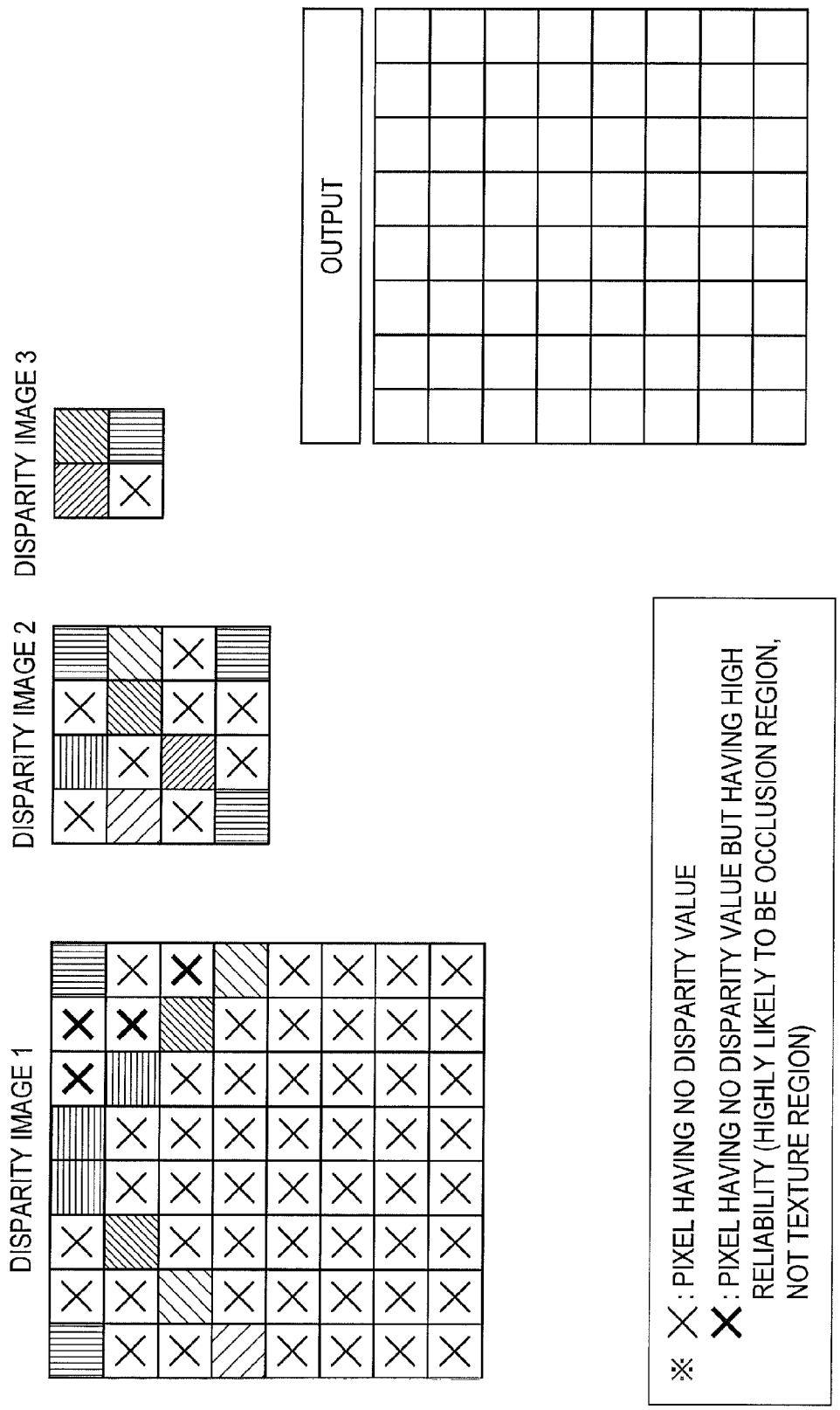
FIG. 24 is a schematic diagram for explaining the processing in the second embodiment.

Firstly, as illustrated in FIG. 24, the disparity image 1, the disparity image 2, and the disparity image 3 are obtained from the respective merging units 108 in the configuration in FIG. 19. In the obtained disparity images, × marks each denote a pixel having no disparity value (a pixel for which a disparity value is not obtained), while boldface × marks each denote a pixel which has no disparity value but has high reliability (highly likely to be an occlusion region, not a texture region).

Figure 25:
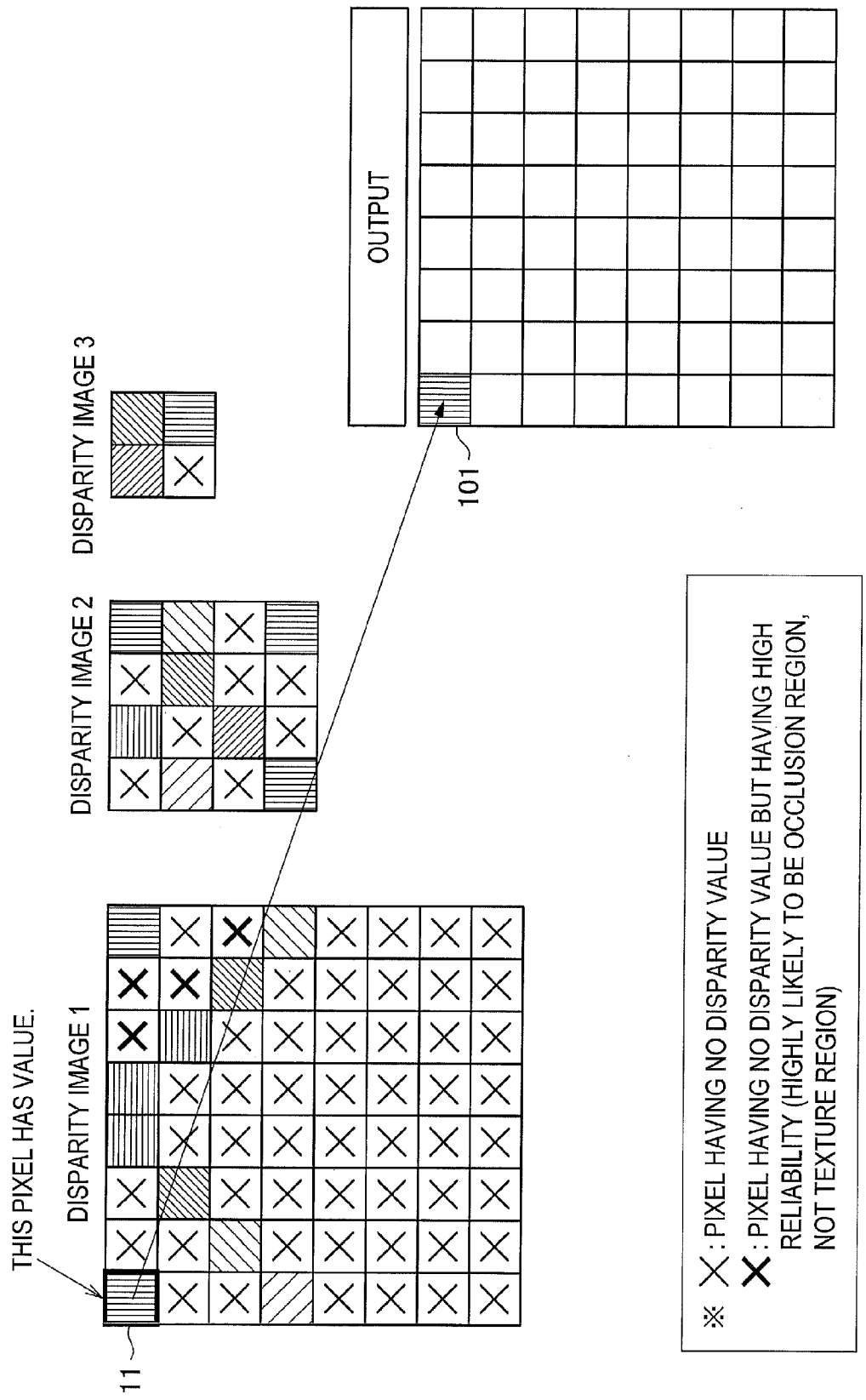
FIG. 25 is a schematic diagram for explaining the processing in the second embodiment.

Then, the merging unit 120 merges the disparity values by using the obtained disparity images 1, 2, and 3, and outputs disparity values. As illustrated in FIG. 25, a disparity value is extracted in order from a pixel 11 located in the upper left corner of the highest-resolution disparity image 1. Since the disparity value is obtained in the pixel 11 in the disparity image, a disparity value of a pixel 101 in a disparity image 10 outputted from the merging unit 120 has the disparity value of the pixel 11 in the disparity image 1.

Figure 26:
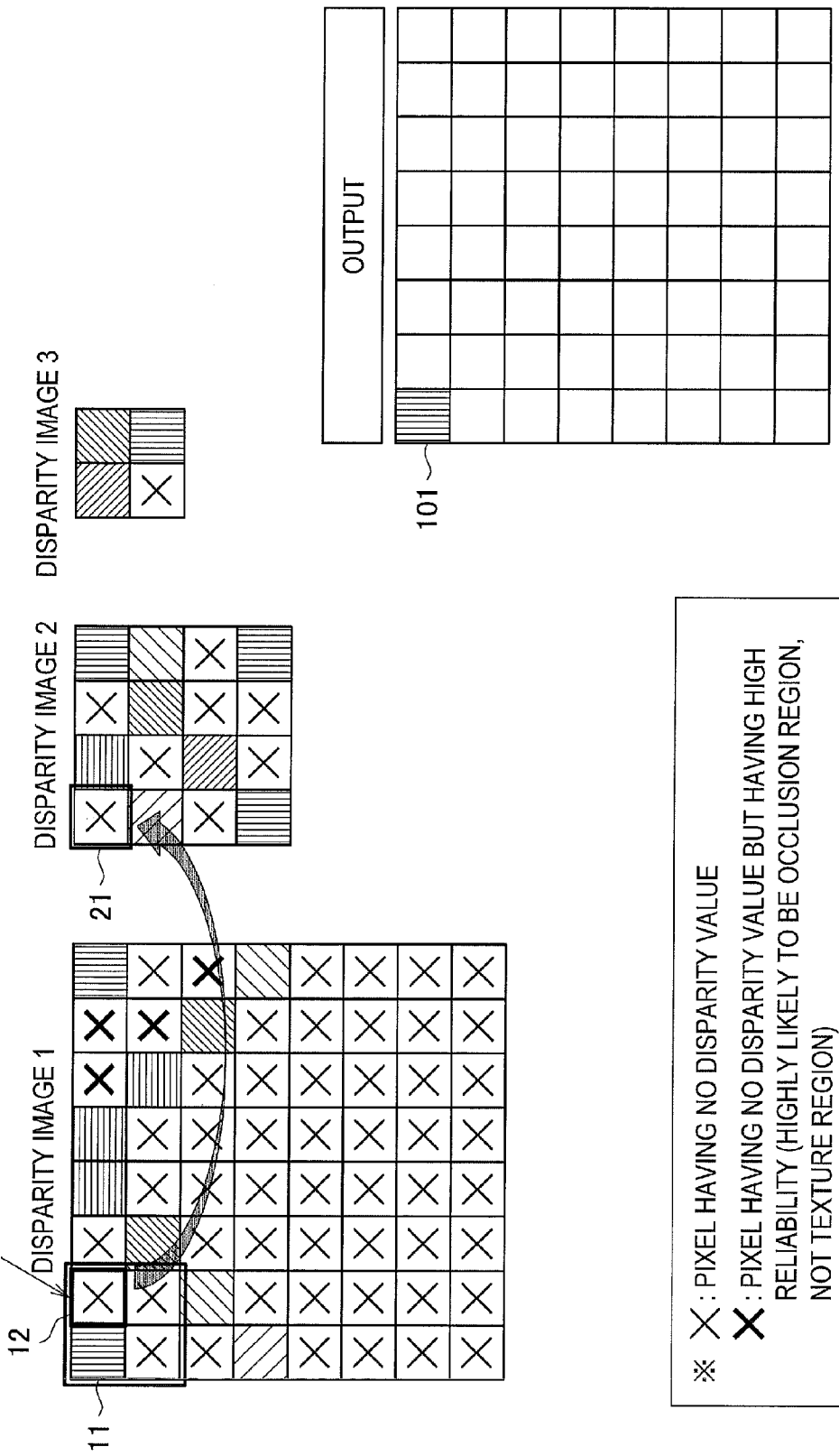
FIG. 26 is a schematic diagram for explaining the processing in the second embodiment.

Next, as illustrated in FIG. 26, a disparity value is extracted from a pixel 12 in the highest-resolution disparity image 1. Since the pixel 12 has no disparity value, a disparity value of a pixel 21 at a position corresponding to the pixel 12 is checked in the one-level-lower-resolution disparity image 2. Since the pixel 21 in the disparity image 2 has no disparity value in the example in FIG. 26, either, a disparity value of a pixel 31 at a position corresponding to the pixel 21 is checked in the disparity image 3 having a further lower resolution, as illustrated in FIG. 27.

Figure 27:
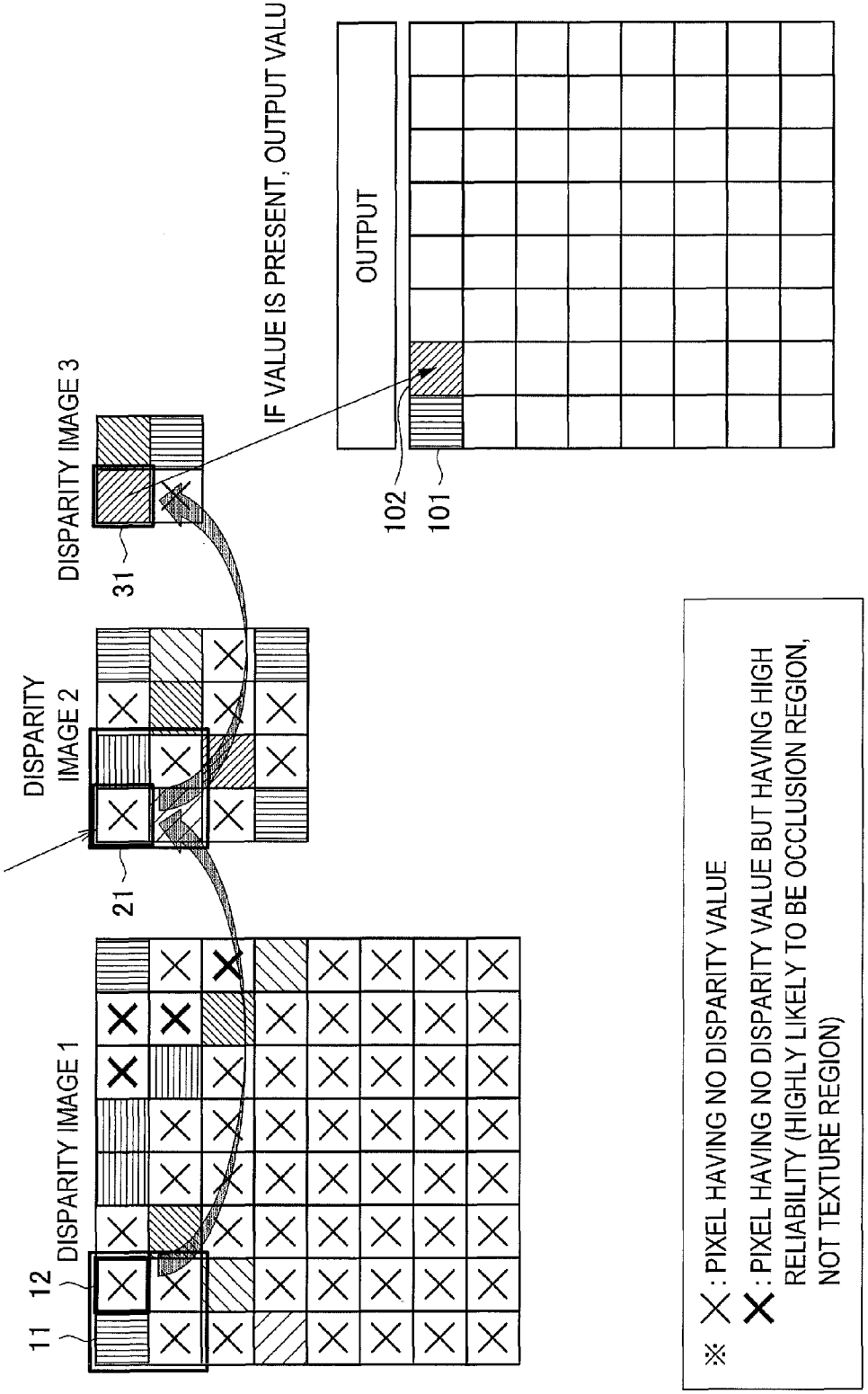
FIG. 27 is a schematic diagram for explaining the processing in the second embodiment.

Since the disparity value is obtained in the pixel 31 in the disparity image 3 in the example in FIG. 27, the disparity value of the pixel 31 in the disparity image 3 is used as a disparity value of a pixel 102 in the disparity image 10 outputted from the merging unit 120.

Figure 28:
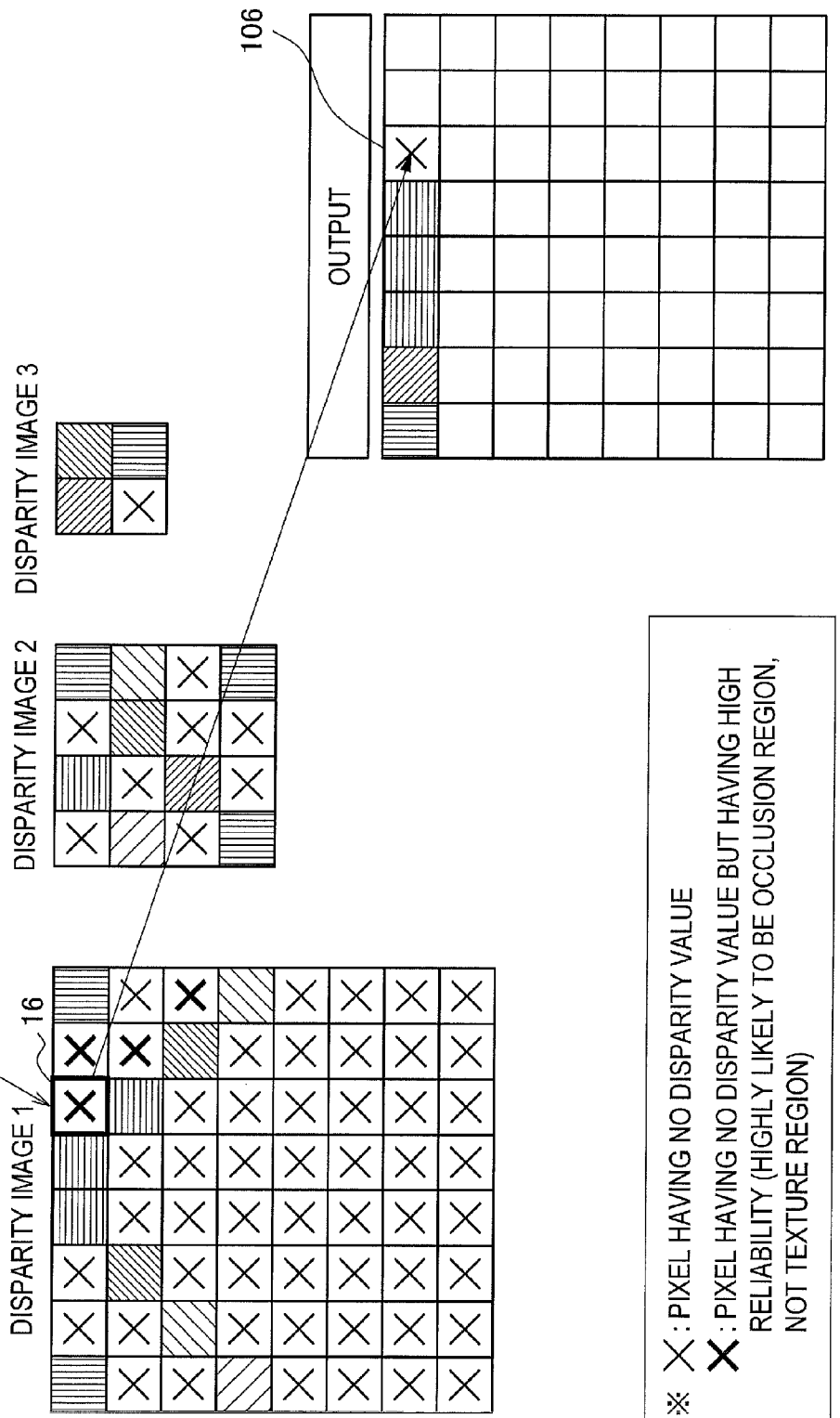
FIG. 28 is a schematic diagram for explaining the processing in the second embodiment.

Next, as illustrated in FIG. 28, a disparity value is extracted from a pixel 16 in the highest-resolution disparity image 1. The pixel 16 has no disparity value, but has high reliability, thus being highly likely to be an occlusion region. Accordingly, "no disparity value" is outputted as a disparity value of a pixel 106 in the disparity image 10 without checking the disparity image 2 which is at a lower level. The processing corresponds to the processing in Steps S204, S206 in FIG. 23.

Figure 29:
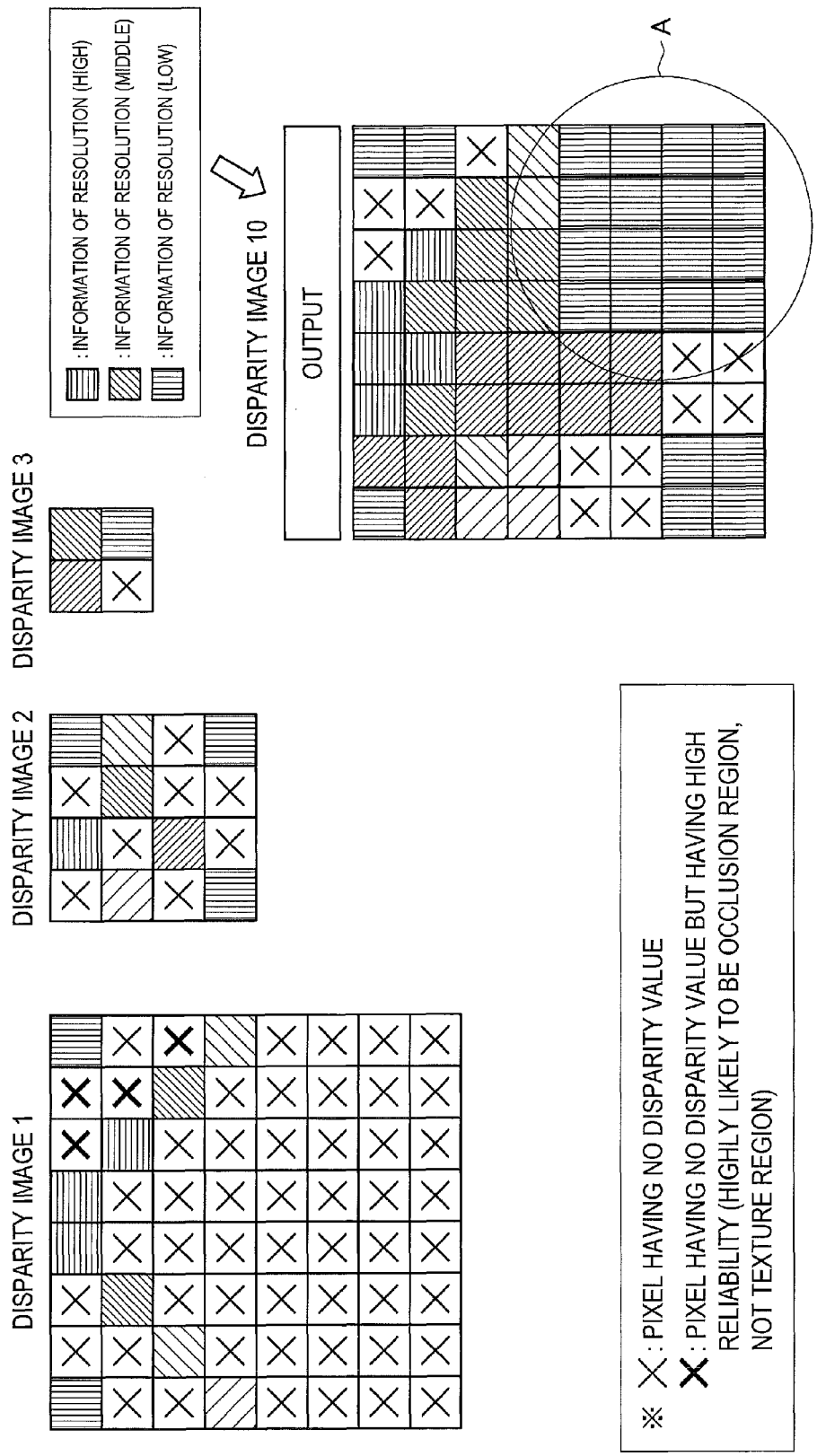
FIG. 29 is a schematic diagram for explaining the processing in the second embodiment.

FIG. 29 illustrates a state where disparity values of all of pixels in the disparity image outputted from the merging unit 120 are determined, after the aforementioned processing is repeated. As clear from a comparison between the disparity image 1 and the disparity image 10, many of the pixels regarded as "no disparity value" in the disparity image 1 are regarded as "having a disparity value" in the disparity image 10. Thus, merging the disparity images having the plurality of resolutions makes it possible to obtain disparity values in more detail.

Figure 30:
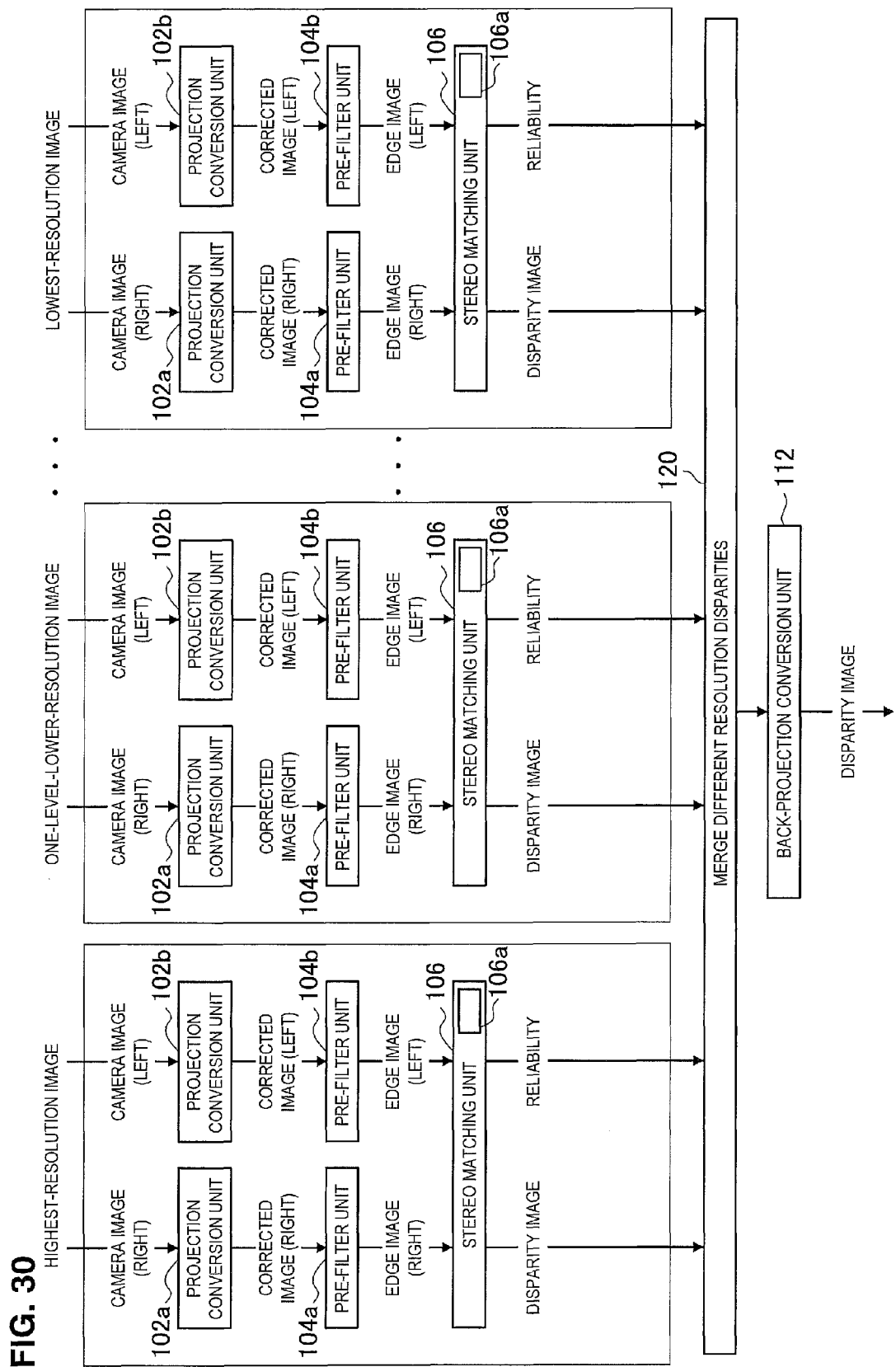
FIG. 30 is a schematic diagram illustrating a configuration in which stereo matching units which are configured to output disparity images 2 and 3, respectively and include reliability calculation units 106a, respectively.

In addition, the description above shows the example of obtaining the reliability in the highest-resolution disparity image, but the stereo matching reliability may be calculated in not only the disparity image 1 but also the disparity images 2 and 3. FIG. 30 illustrates a configuration in which the stereo matching units 106 configured to output the disparity images 2 and 3, respectively, include the respective reliability calculation units 106a. In this case, the reliability can be checked every time "whether a target pixel has a disparity (Steps S200 and S210 in FIG. 23)" is checked in each resolution, and thus more robust processing (disturbance-resistant) can be performed on an occlusion region.

Meanwhile, when a disparity value is filled in by bringing information from a low resolution, a boundary between disparity values might stand out like a block due to a resolution difference. In an example in FIG. 29, a relationship (a resolution of an output>a resolution of original information) is established in a region A, and thus blocks might stand out. For this reason, it is also possible to prevent the block boundary from standing out by using a method described in the following literatures in which luminance information is referred to and up-sampling is performed while maintaining an edge.
(Literature 3) "Joint Bilateral Upsampling"
By Kopf, J., Cohen, M. F., Linschinski, D., Uyttendaele, M. ACM Transaction of Graphics (2007)
(Literature 4) JP 2011-186958A As described above, in the method for merging disparity images having a plurality of resolutions based on high-resolution disparity images, information is made up for from a low-resolution disparity image, and thereby it is possible to minimize regions having no disparity in a high-resolution disparity image.

[2.3. Specific Example of Merging Plurality of Resolutions Based on Low Resolution]

Figure 31:
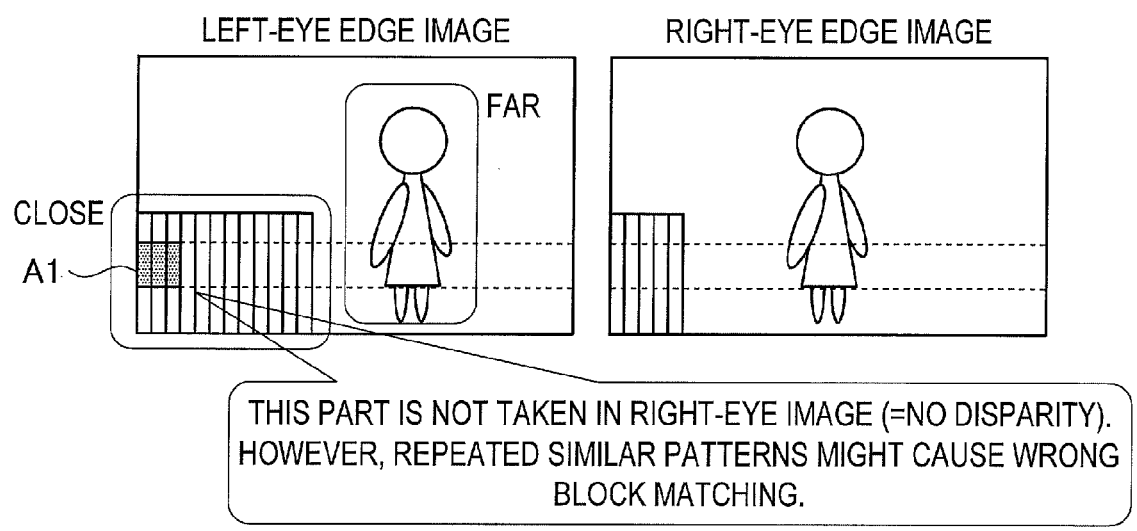
FIG. 31 is a schematic diagram illustrating wrong block matching.

In contrast, use of a high-resolution disparity image might make it difficult to obtain a disparity of an object close to cameras as described with reference to FIGS. 13 to 17, but might result in a disparity value calculated due to mismatching. For example, as illustrated in FIG. 31, suppose a case where furniture 150 or the like having repeated patterns is located relatively close to the cameras. Although a region A1 of the furniture 150 is not shot in a right image, wrong matching might be performed in the block matching, because the furniture 150 has repeated similar patterns.

Figure 32:
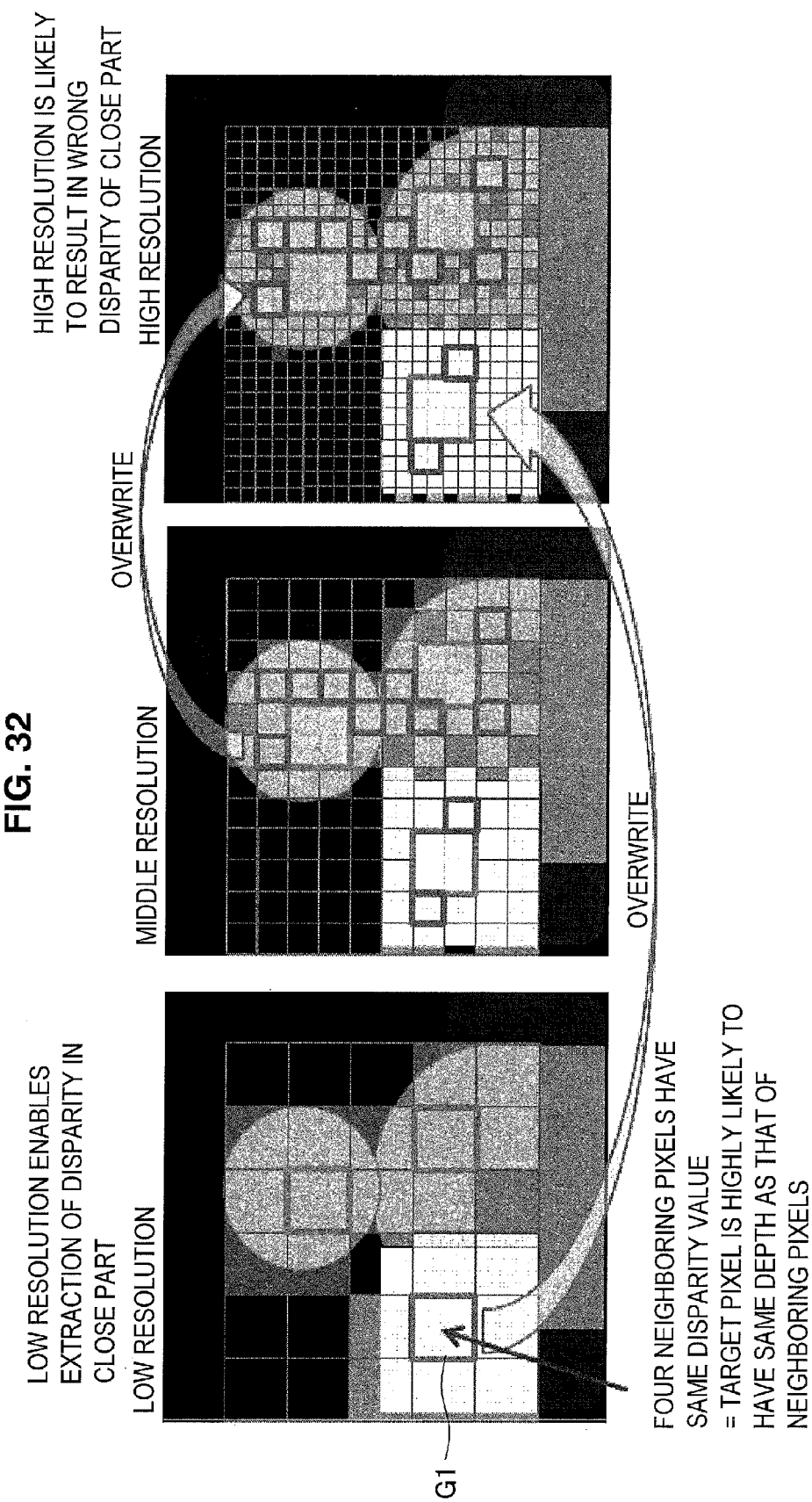
FIG. 32 is a schematic diagram illustrating merging a plurality of resolutions based on a low resolution.

For this reason, a plurality of resolutions based on a low resolution are merged in this case. In a part which can be obtained in a low-resolution disparity image and close to the cameras (having a large disparity), a pixel surrounded by similar disparity values are detected, and the detected disparity value overwrites a disparity value at a corresponding position in a high-resolution image while the disparity of the pixel is trusted. Specifically, as illustrated in FIG. 32, in a low-resolution disparity image, it is possible to extract disparity information with appropriate depth accuracy in a proximity part which is close to the cameras. In contrast, the proximity part has excessive accuracy in the high-resolution disparity image, and has low occlusion resistance. For this reason, a wrong disparity might be obtained for the proximity part in the high-resolution disparity image. Note that FIG. 32 illustrates pixels having the same density have the same disparity value.

Since four pixels neighboring a pixel G1 in FIG. 32 have the same disparity value, the pixel G1 is highly likely to have the same depth as that of the neighboring pixels. Accordingly, a region which is not an edge of a proximity object is judged. For example, it is judged whether all of the four pixels neighboring the pixel G1 in FIG. 32 have depth differences within a predetermined range allowing to be regarded as the same object. Examples of the predetermined depth difference include a depth of approximately 10 cm. A judgment is made by using a disparity equivalent to the depth of approximately 10 cm. When having the depth differences within the predetermined range, all of the four neighboring pixels are judges as a "fill-in target area" which is a non-edge region of the proximity object. Then, the disparity value in the target-resolution image overwrites a disparity value of a part corresponding to the pixel G1 in a highest-resolution disparity image. Alternatively, a disparity value of any region which can be obtained in only a low-resolution image can also overwrite a disparity value of a corresponding region in the high-resolution image, without the edge judgment.

Figure 33:
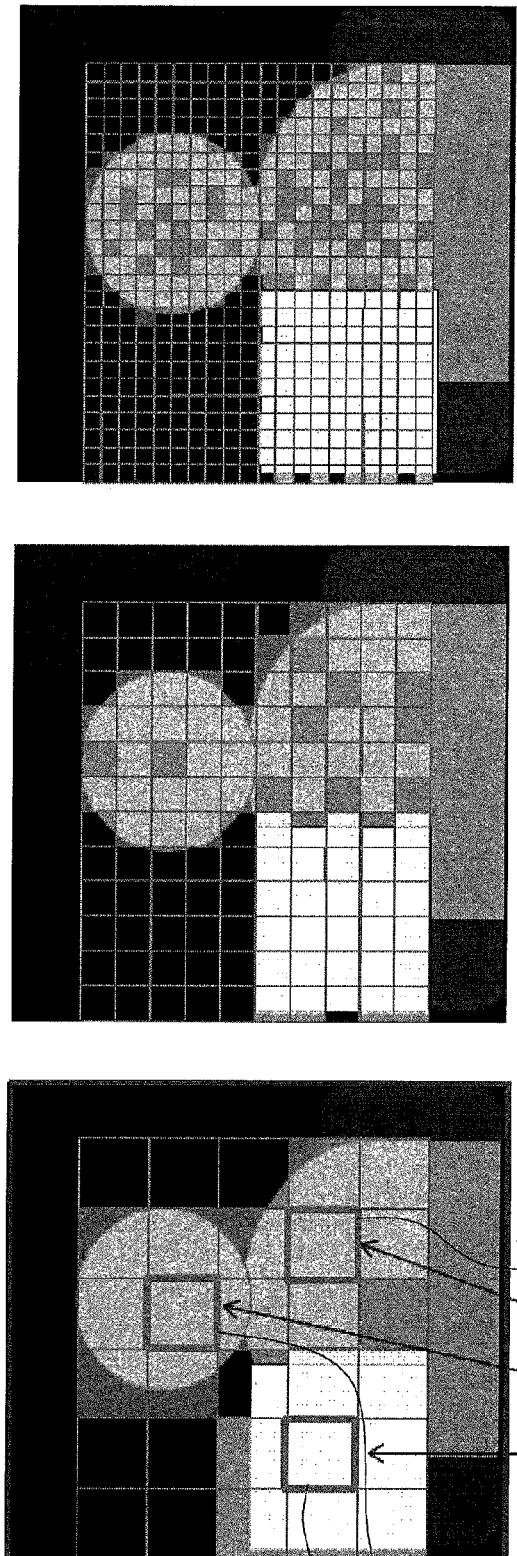
FIG. 33 is a schematic diagram illustrating merging a plurality of resolutions based on a low resolution.

Specifically, as illustrated in FIG. 33, the lowest resolution is a target resolution, and processing of searching for the pixel G1 is performed, the pixel G1 having the same disparity value as those of neighboring pixels. Note that four pixels neighboring a pixel have the same disparity value and the pixel is detected in FIG. 33, any number of the pixel values having the same pixel value and neighboring the target pixel for detection can be determined.

Figure 34:
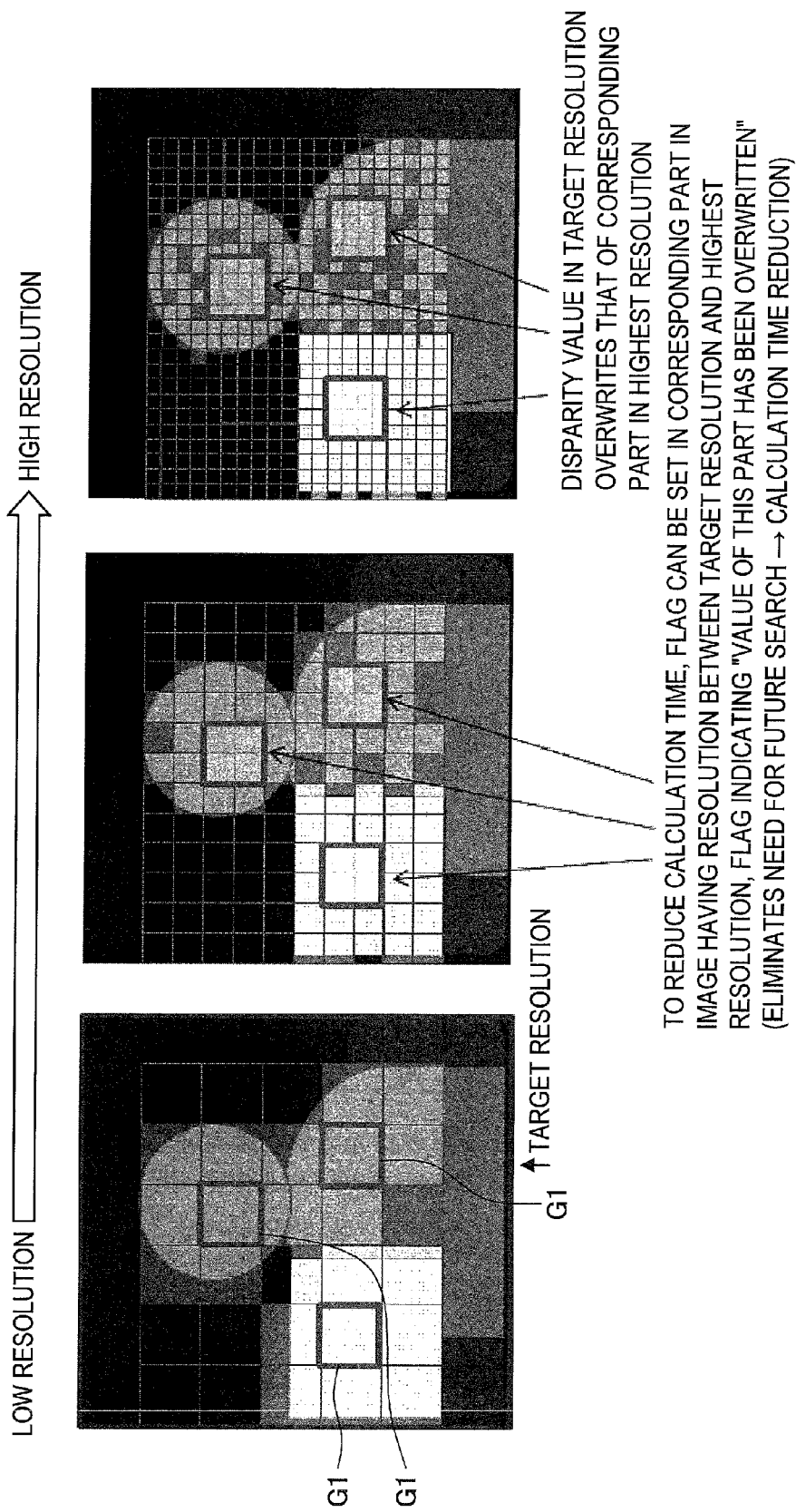
FIG. 34 is a schematic diagram illustrating merging a plurality of resolutions based on a low resolution.

As illustrated in FIG. 34, the disparity value in the target resolution overwrites a disparity value of a part corresponding to the pixel G1 in the highest-resolution disparity image. In addition, for an image having a resolution between the target resolution and the highest resolution, a flag indicating "this part has been overwritten" is set in a corresponding part. Thus, it becomes unnecessary to perform subsequent searching in the region having the flag set therein and thus can reduce a calculation time.

Figure 35:
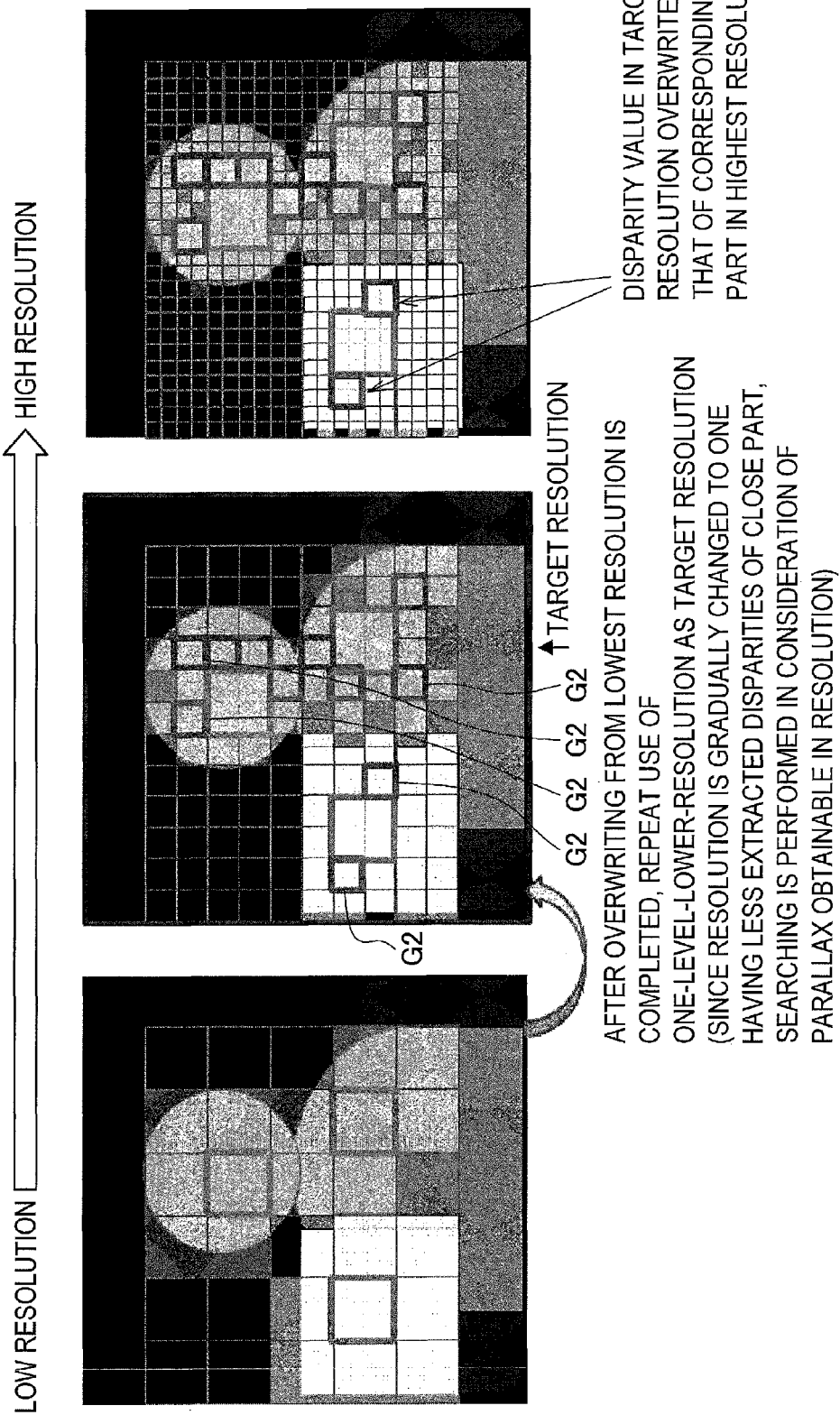
FIG. 35 is a schematic diagram illustrating merging a plurality of resolutions based on a low resolution.

After the overwriting from the lowest resolution is completed as illustrated in FIG. 35, the same processing is repeated while using a one level lower resolution as the target resolution. Then, processing of searching for a pixel G2 having the same disparity value as those of neighboring pixels, and the disparity value in the target resolution overwrites a disparity value of a part corresponding to the pixel G2 in the highest-resolution disparity image. At this time, a lower resolution prevents a disparity in a close part from being obtained, and thus the searching is performed in consideration for a disparity which can be obtained in the resolution.

As described above, in calculating a disparity using a high-resolution image, disparity values are not calculated in a part close to the cameras, and the disparity image has many pixels having no disparity (in a so-called riddled state). However, according to the merging method based on a high resolution, a disparity value in a lower-resolution disparity image can make up for a pixel having no disparity in the high-resolution disparity image, and pixels having no disparity can be minimized.

In calculating a disparity using a high-resolution image, it is assumed that a wrong disparity is calculated in a part close to the cameras. Specifically, calculation of a disparity might fail beyond a + search range. Accordingly, the merging method based on a low resolution is used. A low-resolution disparity image is referred to, a part which is close to the cameras and within an edge of an object is detected, and a disparity value of a corresponding part in a high-resolution disparity image is overwritten. It is thereby possible to overwrite and correct a possibly wrong disparity value in the high-resolution disparity image. As described above, based on the disparity value in the low resolution which allows a depth of a part close to the cameras to be detected appropriately, it is possible to make up for the disparity value in the high resolution and to reduce an amount of calculation.

Note that the merging a plurality of resolutions based on a high resolution and the merging a plurality of resolutions based on a low resolution can used in combination with each other.

[2.4. Method for Enhancing Disparity Obtaining Performance of Target Region]

Figure 36:
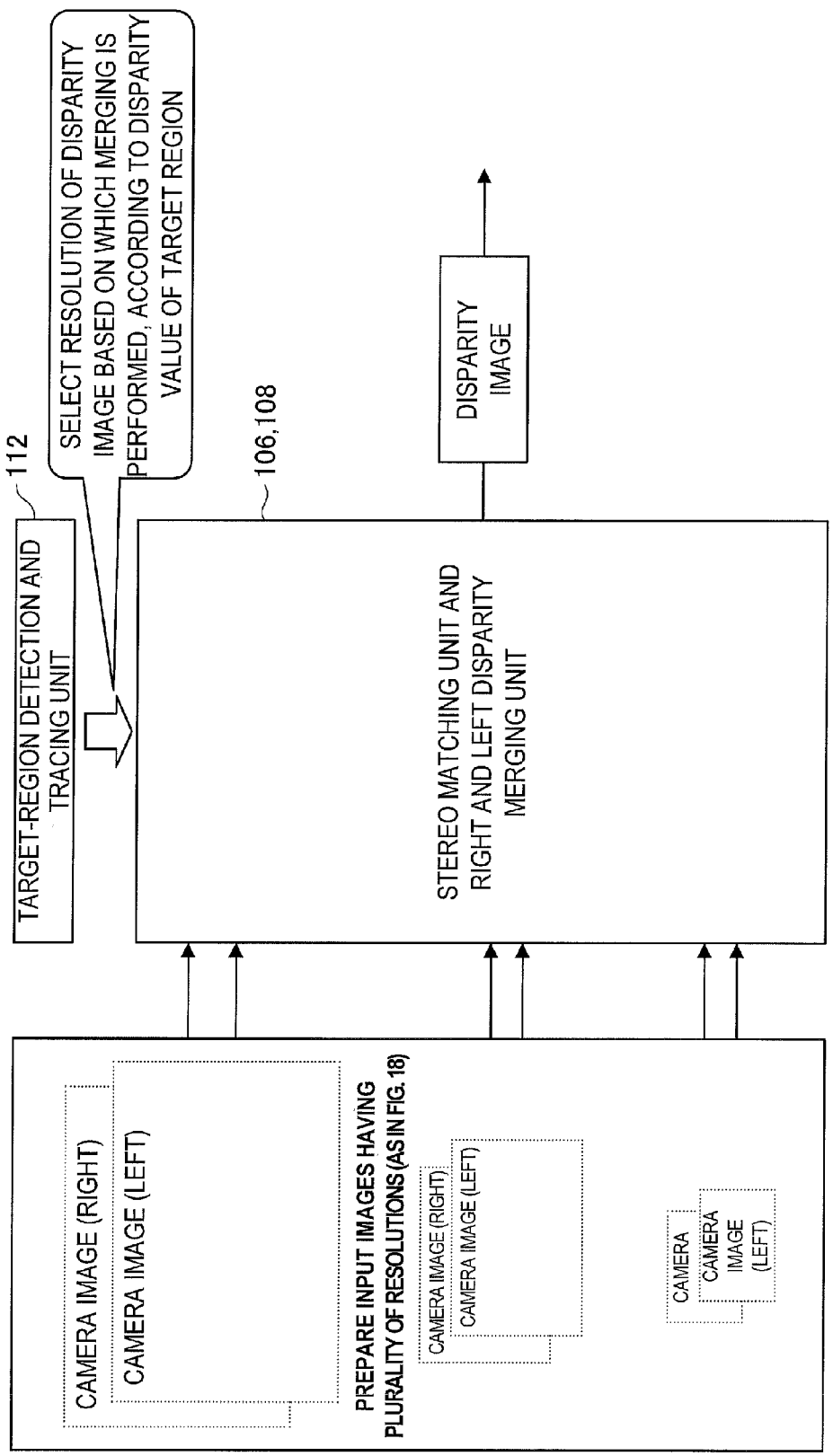
FIG. 36 is a schematic diagram illustrating an example where a target-region detection and tracing unit 112 is added to the same configuration as in FIG. 18.

Next, a description is given of a method for enhancing the disparity obtaining performance of a target region by using disparity images having a plurality of resolutions. To enhance the disparity calculation performance in a target region (such as a hand or a face in an image) desired to favorably obtain a disparity, it is also possible to use disparity images having a plurality of resolutions. In FIG. 36, the target-region detection and tracing unit 112 is added to the same configuration as that in FIG. 18. The target-region detection and tracing unit 112 detects a target region such as a "hand" or a "face" in an image and traces movement of the target region. The stereo matching unit 106 and the merging unit 108 select a resolution of a disparity image based on which the merging is performed, according to a disparity value of the target region.

Note that a method described in JP 2012-113622A, for example, can be used as a method for extracting a target region such as a hand. In this case, firstly a "local tip end part (coordinates of a front-most part in a certain region)" is detected in block units (for example, every 16×16 pixels) and then is compared with a neighboring block (for example, a 3×3 block), and thereby a broad-view tip end part (=a target region) is extracted.

In addition, an index is calculated which indicates "which resolution for merging disparity images should be used for favorably obtaining a disparity of a target region". An average of disparities in the target region in a "lowest-resolution disparity image" considered to be easily filled in with disparity information can be used as an example of the index.

Figure 37:
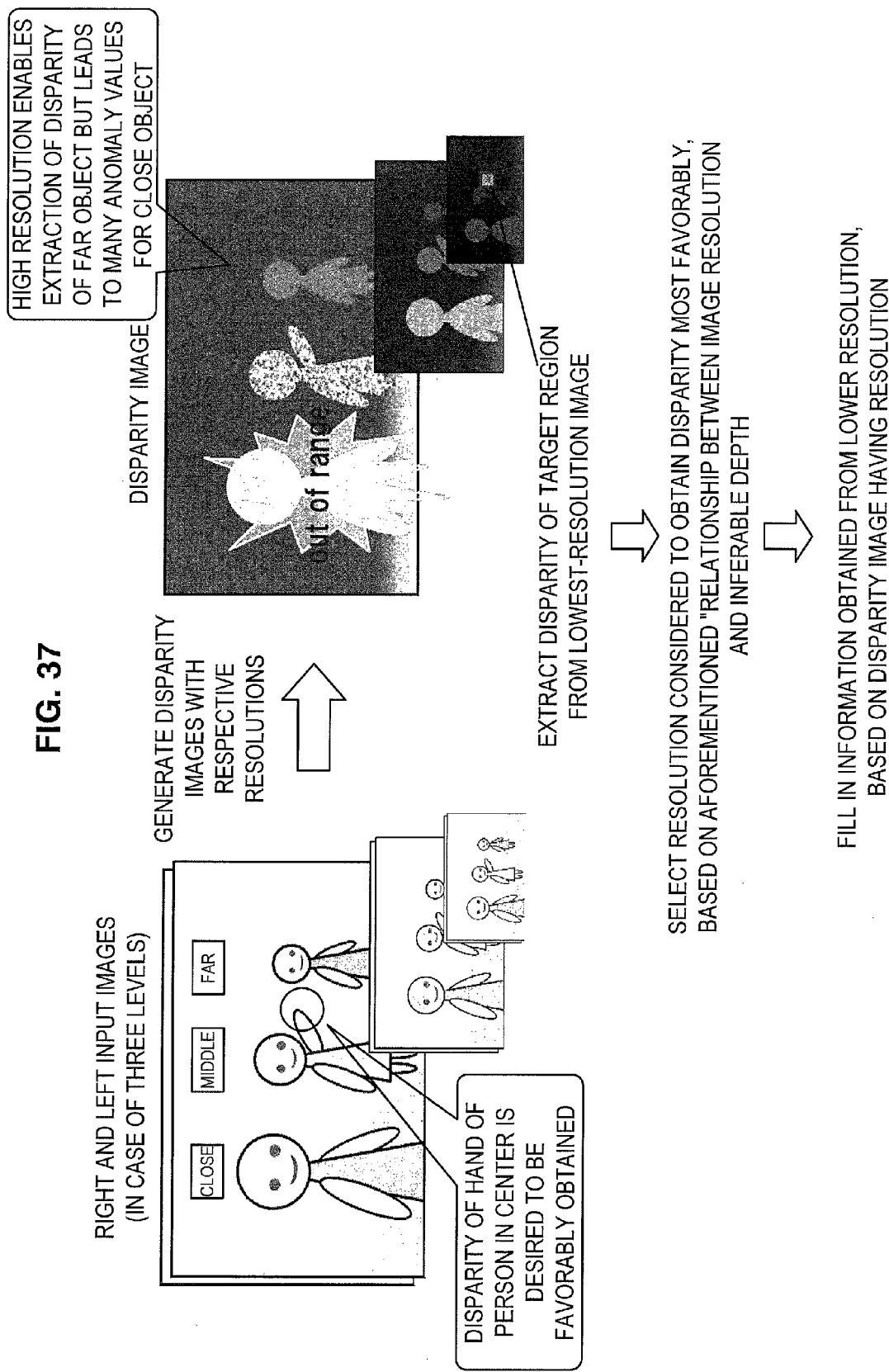
FIG. 37 is a schematic diagram illustrating a method for enhancing the disparity obtaining performance of a target region by using disparity images having a plurality of resolutions.

Based on FIG. 37, a concrete description is given of a case where a disparity of a "hand" of a person in a middle distance from the cameras (person in the center) is desired to be obtained favorably in an image including three persons who are a person in a "short distance" from the cameras, the person in the "middle" distance", and a person in a "long" distance. Firstly, disparity images are generated for respective plurality of resolutions.

With reference to one of the disparity images having a "high" resolution, disparities of the person far from the cameras can be extracted, but disparities of the person close to the cameras have many anomaly values. For this reason, a disparity of the target region (hand) is extracted from a lowest-resolution image. At this time, a resolution considered to allow the disparity to be extracted most favorably is selected, based on "a relationship between an image resolution and an inferable depth" described with reference to FIGS. 15 to 17.

Figure 38:
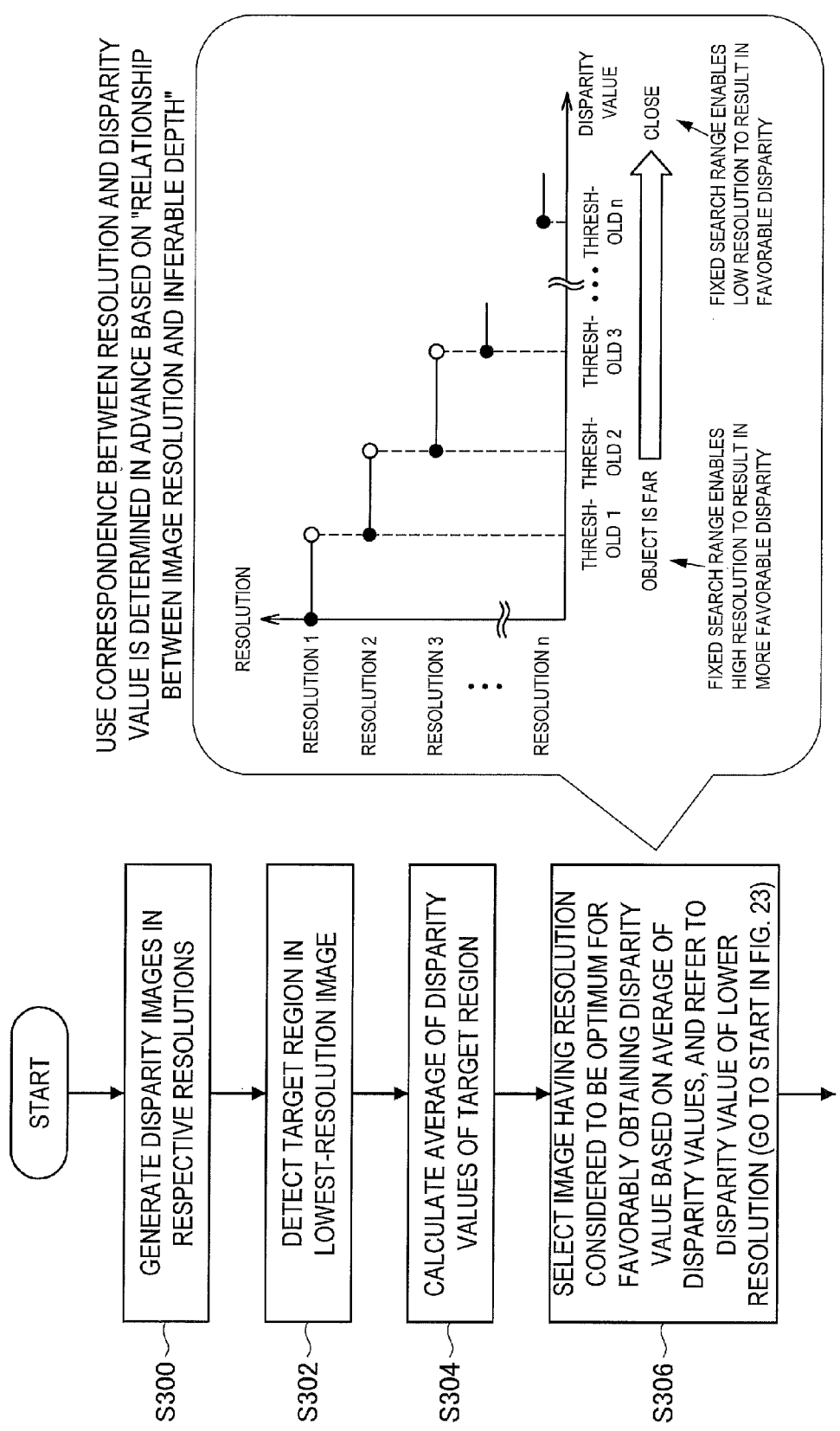
FIG. 38 is a schematic diagram illustrating processing of enhancing the disparity obtaining performance of a target region by using disparity images having a plurality of resolutions.

FIG. 38 is a flowchart illustrating processing. Firstly, in Step S300, disparity images having respective resolutions are generated. In next Step S302, a target region in a lowest-resolution disparity image is obtained. In next Step S304, an average of disparity values of the target region is calculated. In next Step S306, an image having a resolution considered to be optimum for favorably extracting the disparity value of the target region is selected based on the average of the disparity values calculated in Step S304. Based on the selected resolution, a disparity value in a lower resolution disparity image is referred to. Thereafter, the processing moves back to Step S200 in FIG. 23.

At this time, in Step S306, a transfer function indicating use correspondence between a resolution and a disparity value is determined in advance based on the "relationship between an image resolution and an inferable depth" described with reference to FIGS. 15 to 17, and an image having a resolution considered to be optimum is selected based on the transfer function. When a target object is far from the cameras, a high resolution makes it possible to extract the disparity more favorably in the case of a fixed search range. In contrast, when the target object is close to the cameras, a low resolution makes it possible to extract the disparity more favorably in the case of the fixed search range.

Also in this case, information of the aforementioned reliability is calculated for all of the resolutions. When a certain resolution disparity image is made up for based on a disparity value of another disparity image, it is possible to simplify processing in consideration for occlusion.

According to the second embodiment as described above, disparity images having a plurality of resolutions are used, and thereby a disparity value can be obtained by using an optimum resolution disparity image according to a distance from the cameras to a subject. Thus, it is possible to minimize pixels having a disparity value of 0 and to prevent a wrong disparity value reliably.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing apparatus including:
a stereo matching unit configured to obtain right and left disparity images by using stereo matching, based on a pair of images captured by right and left cameras, respectively;
a filter processing unit configured to perform filter processing on the disparity images; and
a first merging unit configured to make a comparison, in the disparity images that have undergone the filter processing, between disparity values at mutually corresponding positions in the right and left disparity images and to merge the disparity values of the right and left disparity images based on a comparison result.

(2) The image processing apparatus according to (1),
wherein the filter processing unit performs the filter processing on at least one of the right and left disparity images.

(3) The image processing apparatus according to (1),
wherein the filter processing unit performs the filter processing on each of the right and left disparity images.

(4) The image processing apparatus according to (1),
wherein the filter processing unit includes a median filter.

(5) The image processing apparatus according to (1),
wherein the filter processing unit performs the filter processing on one of the right and left disparity images, and
wherein the first merging unit compares a disparity value of a particular pixel in the one of the disparity images that have undergone the filter processing with disparity values of a pixel corresponding to the particular pixel and a plurality of neighboring pixels in the other disparity image that have not undergone the filter processing.

(6) The image processing apparatus according to (5),
wherein the first merging unit merges the disparity values, based on results of comparison between a predetermined threshold and a difference between the disparity value of the particular pixel and each of the disparity values of the pixel corresponding to the particular pixel and a plurality of neighboring pixels in the other disparity image.

(7) The image processing apparatus according to (6),
wherein the first merging unit merges the disparity values based on a transfer function defining a relationship between the predetermined threshold and reliability of the disparity values.

(8) The image processing apparatus according to (1), further including:
a second merging unit
configured to obtain the captured images having a plurality of resolutions,
a plurality of the stereo matching units, a plurality of the filter processing units, and a plurality of the first merging units being provided for each of the plurality of resolutions, and
configured to merge the disparity values of the respective plurality of resolutions each merged by the first merging unit.

(9) The image processing apparatus according to (8),
wherein when a disparity value of a particular pixel in one of the disparity images which has a first resolution is not obtained, the second merging unit merges the disparity values of the respective plurality of resolutions, based on a disparity value of a pixel corresponding to the particular pixel in one of the disparity images which has a second resolution lower than the first resolution.

(10) The image processing apparatus according to (9),
wherein the stereo matching unit includes a reliability calculation unit configured to calculate reliability of the disparity values of the right and left disparity images, and
wherein when the reliability is higher than a predetermined threshold and the disparity value of the particular pixel in the disparity image having the first resolution is not obtained, the second merging unit considers the disparity value as an unknown value.

(11) The image processing apparatus according to (8),
wherein the second merging unit overwrites a disparity value of one of the disparity images which has a second resolution higher than a first resolution, based on a disparity value of one of the disparity images which has the first resolution.

(12) The image processing apparatus according to (11),
wherein when the disparity value of the particular pixel of the disparity image having the first resolution and disparity values of plurality of pixels neighboring the particular pixel are within a predetermined range, the second merging unit overwrites the disparity value of a pixel corresponding to the particular pixel in the disparity image having the second resolution, based on the disparity value of the particular pixel.

(13) The image processing apparatus according to (8),
wherein the second merging unit selects one of the plurality of resolutions based on a disparity value of a target region in a disparity image having a lowest resolution among the plurality of resolutions, and performs merging on the disparity value of the target region based on a disparity image having the selected resolution.

(14) An image processing method including:
obtaining right and left disparity images by using stereo matching, based on a pair of images captured by right and left cameras, respectively;
performing filter processing on the disparity images; and
making a comparison, in the disparity images that have undergone the filter processing, between disparity values at mutually corresponding positions in the right and left disparity images and merging the disparity values of the right and left disparity images based on a comparison result.

What is claimed is:
1. An image processing method comprising:
obtaining right and left disparity images by using stereo matching, based on a pair of images captured by right and left cameras, respectively;
performing filter processing on one of the right or left disparity images, by replacing a pixel value of a first pixel of a plurality of pixels forming a pixel region with a median of pixel values respectively of the plurality of pixels; and
making a comparison, in the one of the right or left disparity images that have undergone the filter processing, between disparity values at mutually corresponding positions in the right and left disparity images and merging the disparity values of the right and left disparity images based on a comparison result,
wherein, in the comparison, a disparity value of a particular pixel in the one of disparity images that has undergone the filter processing is compared with disparity values of a pixel corresponding to the particular pixel and a plurality of neighboring pixels in the other disparity image that have not undergone the filter processing.

* * * * *